United States Patent
Lovett et al.

(10) Patent No.: US 10,372,647 B2
(45) Date of Patent: Aug. 6, 2019

(54) EXASCALE FABRIC TIME SYNCHRONIZATION

(71) Applicant: INTEL CORPORATION, Santa Clara, CA (US)

(72) Inventors: Thomas D. Lovett, Portland, OR (US); Michael A. Parker, Santa Clara, CA (US); Mark S. Birrittella, Chippewa Falls, WI (US)

(73) Assignee: Intel Corporation, Santa Clara, CA (US)

( * ) Notice: Subject to any disclaimer, the term of this patent is extended or adjusted under 35 U.S.C. 154(b) by 758 days.

(21) Appl. No.: 14/977,773

(22) Filed: Dec. 22, 2015

(65) Prior Publication Data
US 2017/0177527 A1    Jun. 22, 2017

(51) Int. Cl.
| | |
|---|---|
| *G06F 13/00* | (2006.01) |
| *G06F 13/40* | (2006.01) |
| *G06F 1/12* | (2006.01) |
| *G06F 13/364* | (2006.01) |
| *G06F 13/42* | (2006.01) |

(52) U.S. Cl.
CPC ............ *G06F 13/4022* (2013.01); *G06F 1/12* (2013.01); *G06F 13/364* (2013.01); *G06F 13/4282* (2013.01)

(58) Field of Classification Search
CPC .............................. G06F 13/4022; G06F 1/12
See application file for complete search history.

(56) References Cited

U.S. PATENT DOCUMENTS

| | | |
|---|---|---|
| 5,935,232 A | 8/1999 | Lambrecht et al. |
| 2005/0094640 A1* | 5/2005 | Howe ................. H04L 47/2416 370/395.1 |

(Continued)

OTHER PUBLICATIONS

Jasperneite et al., "Enhancements to the Time Synchronization Standard IEEE-1588 for a System of Cascaded Bridges", Proceedings of 2004 IEEE International Workshop on Factory Communication Systems, Sep. 22-24, 2004, pp. 239-244.

(Continued)

*Primary Examiner* — Zachary K Huson
(74) *Attorney, Agent, or Firm* — Law Office of R. Alan Burnett, P.S

(57) ABSTRACT

Methods and apparatus for implementing time synchronization across exascale fabrics. A master clock node is coupled to a plurality of slave nodes via a fabric comprising a plurality of fabric switches and a plurality of fabric links, wherein each slave node is connected to the master clock node via a respective clock tree path that traverses at least one fabric switch. The fabric switches are configured to selectively forward master clock time data internally along paths with fixed latencies that bypass the switches' buffers and switch circuitry, which enables the entire clock tree paths to also have fixed latencies. The fixed latency of the clock tree path is determined for each slave node. The local clocks of the slave nodes are then synchronized with the master clock by using master clock time data received by each slave node and the fixed latency of the clock tree path from the master clock node to the slave node that is determined. Techniques for determining a clock rate mismatch between the master clock and a local clock is also provided.

25 Claims, 16 Drawing Sheets

(56) References Cited

U.S. PATENT DOCUMENTS

2009/0207832 A1 8/2009 Senthilnathan et al.
2013/0100948 A1 4/2013 Irvine
2014/0126615 A1 5/2014 Agami et al.
2016/0170439 A1* 6/2016 Aweya .................. G06F 1/12
　　　　　　　　　　　　　　　　　　　　713/401

OTHER PUBLICATIONS

International Search Report and Written Opinion received for PCT Patent Application No. PCT/US2016/062195, dated Feb. 14, 2017, 15 pages.

* cited by examiner

| |
|---|
| Flit 0[64:0] |
| Flit 1[64:0] |
| Flit 2[64:0] |
| Flit 3[64:0] |
| Flit 4[64:0] |
| Flit 5[64:0] |
| Flit 6[64:0] |
| Flit 7[64:0] |
| Flit 8[64:0] |
| Flit 9[64:0] |
| Flit 10[64:0] |
| Flit 11[64:0] |
| Flit 12[64:0] |
| Flit 13[64:0] |
| Flit 14[64:0] |
| Flit 15[64:0] |
| LCRC[15:0] |

*Fig. 5*

| Flit 0[64:0] |
|---|
| Flit 1[64:0] |
| Flit 2[64:0] |
| Flit 3[64:0] |
| Flit 4[64:0] |
| Flit 5[64:0] |
| Flit 6[64:0] |
| Flit 7[64:0] |
| Flit 8[64:0] |
| Flit 9[64:0] |
| Flit 10[64:0] |
| Flit 11[64:0] |
| Flit 12[64:0] |
| Flit 13[64:0] |
| Flit 14[64:0] |
| Flit 15[64:0] |
| LCRC[13:0] C[1:0] |

*Fig. 6*

| Flit 0[64:0] | | | |
|---|---|---|---|
| Flit 1[64:0] | | | |
| Flit 2[64:0] | | | |
| Flit 3[64:0] | | | |
| Flit 4[64:0] | | | |
| Flit 5[64:0] | | | |
| Flit 6[64:0] | | | |
| Flit 7[64:0] | | | |
| Flit 8[64:0] | | | |
| Flit 9[64:0] | | | |
| Flit 10[64:0] | | | |
| Flit 11[64:0] | | | |
| Flit 12[64:0] | | | |
| Flit 13[64:0] | | | |
| Flit 14[64:0] | | | |
| Flit 15[64:0] | | | |
| LCRC3[11:0] | LCRC2[11:0] | LCRC1[11:0] | LCRC0[11:0] |

*Fig. 7*

| Distinguishing Control Flit 0[64:0] |
|---|
| Reserved 1[64:0] |
| Reserved 2[64:0] |
| Reserved 3[64:0] |
| Reserved 4[64:0] |
| Reserved 5[64:0] |
| Reserved 6[64:0] |
| Reserved 7[64:0] |
| Reserved 8[64:0] |
| Reserved 9[64:0] |
| Reserved 10[64:0] |
| Reserved 11[64:0] |
| Reserved 12[64:0] |
| Reserved 13[64:0] |
| Reserved 14[64:0] |
| Reserved 15[64:0] |
| LCRC[15:0] |

*Fig. 8*

EXASCALE FABRIC TIME SYNCHRONIZATION

BACKGROUND INFORMATION

High-performance computing (HPC) has seen a substantial increase in usage and interests in recent years. Historically, HPC was generally associated with so-called "Super computers." Supercomputers were introduced in the 1960s, made initially and, for decades, primarily by Seymour Cray at Control Data Corporation (CDC), Cray Research and subsequent companies bearing Cray's name or monogram. While the supercomputers of the 1970s used only a few processors, in the 1990s machines with thousands of processors began to appear, and more recently massively parallel supercomputers with hundreds of thousands of "off-the-shelf" processors have been implemented.

There are many types of HPC architectures, both implemented and research-oriented, along with various levels of scale and performance. However, a common thread is the interconnection of a large number of compute units, such as processors and/or processor cores, to cooperatively perform tasks in a parallel manner. Under recent System on a Chip (SoC) designs and proposals, dozens of processor cores or the like are implemented on a single SoC, using a 2-dimensional (2D) array, torus, ring, or other configuration. Additionally, researchers have proposed 3D SoCs under which 100's or even 1000's of processor cores are interconnected in a 3D array. Separate multicore processors and SoCs may also be closely-spaced on server boards, which, in turn, are interconnected in communication via a backplane or the like. Another common approach is to interconnect compute units in racks of servers (e.g., blade servers and modules) that are typically configured in a 2D array as cluster of compute nodes.

There are various types of processing tasks that require precise synchronization across various sets of servers and/or compute nodes. For example, when deployed in a cluster, the compute nodes typically send messages between themselves, and the order that the messages are received is very important. For this reason, there are various ordering models that may employed to ensure messages are processed in the proper order, including FIFO (First-in, First-out), Total, and Causal ordering. Each of these ordering schemes requires additional overhead that results in reduced performance. For example, FIFO ordering may typically require use of FIFO routers, Total ordering requires messages to be sent through a central entity, and Causal ordering is typically implemented using vector clocks.

Ideally, the most effective ordering scheme would simply involve timestamping each message with an absolute time. This would support Absolute ordering, which is the preferred ordering scheme for many HPC and other processes. However, this is inherently difficult to implement, because there is no such thing as absolute time that is shared across an HPC environment. More accurately, it isn't so much that the time needs to be absolute, but rather the timeclocks running on each server are synchronized.

One scheme for synchronizing clocks is defined by the IEEE 1588 standards. IEEE 1588 provides a standard protocol for synchronizing clocks connected via a multicast capable network, such as Ethernet. IEEE 1588 was designed to provide fault tolerant synchronization among heterogeneous networked clocks requiring little network bandwidth overhead, processing power, and administrative setup. IEEE 1588 provides this by defining a protocol known as the precision time protocol, or PTP.

A heterogeneous network of clocks is a network containing clocks of varying characteristics, such as the origin of a clock's time source, and the stability of the clock's frequency. The PTP protocol provides a fault tolerant method of synchronizing all participating clocks to the highest quality clock in the network. IEEE 1588 defines a standard set of clock characteristics and defines value ranges for each. By running a distributed algorithm, called the best master clock algorithm (BMC), each clock in the network identifies the highest quality clock; that is the clock with the best set of characteristics.

The highest ranking clock is called the 'grandmaster' clock, and synchronizes all other 'slave' clocks. If the 'grandmaster' clock is removed from the network, or if its characteristics change in a way such that it is no longer the 'best' clock, the BMC algorithm provides a way for the participating clocks to automatically determine the current 'best' clock, which becomes the new grandmaster. The best master clock algorithm provides a fault tolerant, and administrative free way of determining the clock used as the time source for the entire network.

Slave clocks synchronize to the 1588 grandmaster by using bidirectional multicast communication. The grandmaster clock periodically issues a packet called a 'sync' packet containing a timestamp of the time when the packet left the grandmaster clock. The grandmaster may also, optionally, issue a 'follow up' packet containing the timestamp for the 'sync' packet. The use of a separate 'follow up' packet allows the grandmaster to accurately timestamp the 'sync' packet on networks where the departure time of a packet cannot be known accurately beforehand. For example, the collision detection and random back off mechanism of Ethernet communication prevents the exact transmission time of a packet from being known until the packet is completely sent without a collision being detected, at which time it is impossible to alter the packet's content.

While IEEE 1588 and the PTP provides an adequate level of clock synchronization for some applications (on the order of 10 s of microseconds), it is not precise enough to meet the needs of many HPC environments. Accordingly, it would be advantageous to implement a mechanism that maintains clock synchronization that is several orders of magnitude better than IEEE 1588.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a schematic diagram illustrating a plurality of flits grouped in a bundle;

FIG. 4 is a schematic diagram illustrating the structure of a Fabric Packet, according to one embodiment;

FIG. 5 is a diagram illustrating the data structure of a standard detection LTP, according to one embodiment;

FIG. 6 is a diagram illustrating the data structure of a 14-bit CRC LTP, according to one embodiment;

FIG. 7 is a diagram illustrating the data structure of an enhanced detection LTP, according to one embodiment;

FIG. 8 is a diagram illustrating the data structure of a standard detection Null LTP, according to one embodiment;

DETAILED DESCRIPTION

Figure 1:
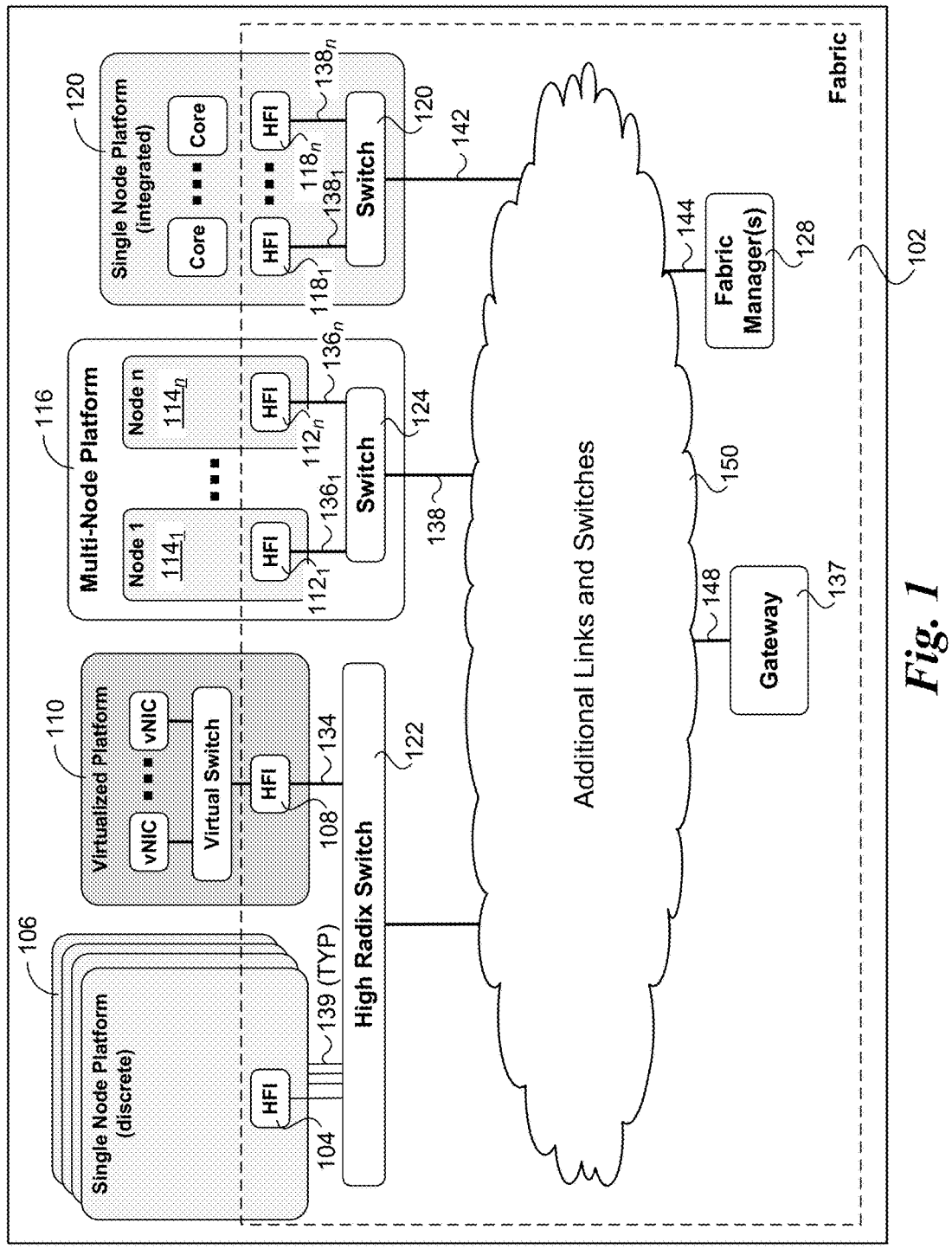
FIG. 1 is a schematic diagram illustrating a high-level view of a system comprising various components and interconnects of the fabric architecture, according to one embodiment.

Embodiments of methods and apparatus for implementing time synchronization across exascale fabrics are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described herein, a mechanism is provided that facilitates extremely accurate time synchronization across an exascale fabric. In exemplary embodiments, the fabric supports inherent reliability at the Link layer (Layer 2) without requiring end-to-end acknowledgements at a higher layer, such as used by TCP over Ethernet networks. In order to have a better understanding of how the mechanism may be implemented, a discussion of the exascale fabric is first discussed, followed by a detailed description of the time synchronization mechanism.

In accordance with aspects of the exascale fabric, an architecture is provided that defines a message passing, switched, server interconnection network. The architecture spans the OSI Network Model Layers 1 and 2, leverages IETF Internet Protocol for Layer 3, and includes a combination of new and leveraged specifications for Layer 4 of the architecture.

The architecture may be implemented to interconnect CPUs and other subsystems that comprise a logical message passing configuration, either by formal definition, such as a supercomputer, or simply by association, such a group or cluster of servers functioning in some sort of coordinated manner due to the message passing applications they run, as is often the case in cloud computing. The interconnected components are referred to as nodes. The architecture may also be implemented to interconnect processor nodes with an SoC, multi-chip module, or the like. One type of node, called a Host, is the type on which user-mode software executes. In one embodiment, a Host comprises a single cache-coherent memory domain, regardless of the number of cores or CPUs in the coherent domain, and may include various local I/O and storage subsystems. The type of software a Host runs may define a more specialized function, such as a user application node, or a storage or file server, and serves to describe a more detailed system architecture.

At a top level, the architecture defines the following components:

Host Fabric Interfaces (HFIs);
Links;
Switches;
Gateways; and
A comprehensive management model.

Host Fabric Interfaces (HFIs) minimally consist of the logic to implement the physical and link layers of the architecture, such that a node can attach to a fabric and send and receive packets to other servers or devices. HFIs include the appropriate hardware interfaces and drivers for operating system and VMM (Virtual Machine Manager) support. An HFI may also include specialized logic for executing or accelerating upper layer protocols and/or offload of transport protocols. An HFI also includes logic to respond to messages from network management components. Each Host is connected to the architecture fabric via an HFI.

Links are full-duplex, point-to-point interconnects that connect HFIs to switches, switches to other switches, or switches to gateways. Links may have different physical configurations, in circuit board traces, copper cables, or optical cables. In one embodiment the implementations the PHY (Physical layer), cable, and connector strategy is to follow those for Ethernet, specifically 100 GbE (100 gigabits per second Ethernet, such as the Ethernet links defined in IEEE 802.3bj—2014 standard. The architecture is flexible, supporting use of future Ethernet or other link technologies that may exceed 100 GbE bandwidth. High-end supercomputer products may use special-purpose (much higher bandwidth) PHYs, and for these configurations interoperability with architecture products will be based on switches with ports with differing PHYs.

FIG. 1 shows a high-level view of a system 100 illustrating various components and interconnects of the architecture, according to one embodiment. A central feature of the architecture is the fabric 102, which includes a collection of the HFIs and gateways interconnected via the architecture's links and switches. As depicted in FIG. 1, the fabric 102 components includes multiple HFIs 104 (one is shown), each hosted by a respective discrete single node platform 106, an HFI 108 hosted by a virtual platform 110, HFIs $112_1$ and $112_n$ hosted by respective nodes $114_1$ and $114_n$ of a multi-node platform 116, and HFIs $118_1$ and $118_n$ of an integrated single node platform 120, a high radix switch 122, switches 124 and 126, fabric manager(s) 128, a gateway 130, links 132, 134, $136_1$, $136_n$, 138, $140_1$, $140_n$, 142, 144, 148, and additional links and switches collectively shown as a cloud 150.

As discussed above, switches are a Layer 2 devices and act as packet forwarding mechanisms within a fabric. Switches are centrally provisioned and managed by the fabric management software, and each switch includes a management agent to respond to management transactions. Central provisioning means that the forwarding tables are programmed by the fabric management software to implement specific fabric topologies and forwarding capabilities, like alternate routes for adaptive routing. Switches are responsible for executing QoS features such as adaptive routing and load balancing, and also implement congestion management functions.

Figure 2:
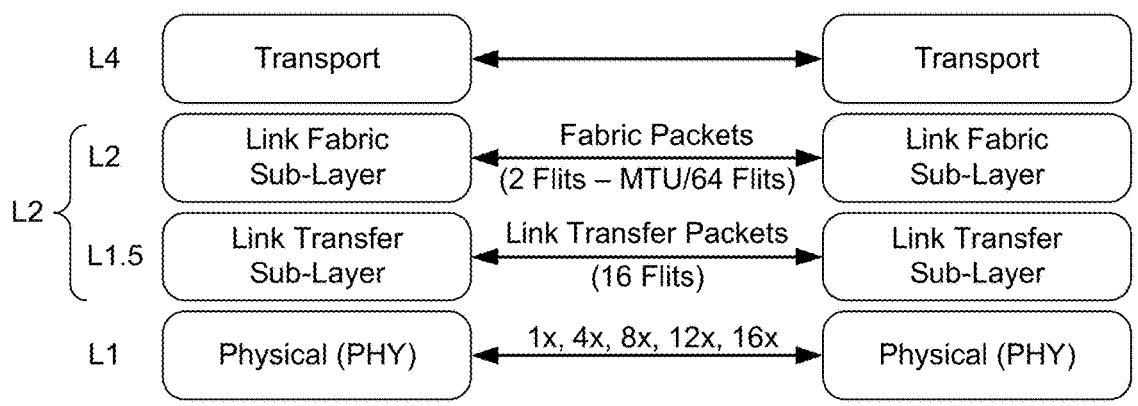
FIG. 2 is a schematic diagram depicting the architecture's layers for transferring data over the fabric links, according to one embodiment.

FIG. 2 depicts the architecture's layers for transferring data over the fabric links. The layers include a Physical (PHY) Layer, a Link Transfer Sub-Layer, a Link Fabric Sub-Layer, and a Transport Layer. At the left of FIG. 2 is the mapping of the layers to the OSI reference model under which the PHY Layer maps to Layer 1 (PHY Layer), the Link Transfer Sub-Layer and Link Fabric Sub-Layer collectively map to Layer 2 (Link Layer), and the Transport Layer maps to Layer 4 (Transport Layer).

In the architecture, signals are grouped together in the Physical Layer into ports, which behave, can be controlled, and are reported as a monolithic entity. A port comprises one or more physical lanes, wherein each lane consists of two differential pairs or fibers implemented in the physical transmission medium, one for each direction of communication. The number of lanes that comprise a port is implementation-dependent; however, the architecture of the Link Transfer Sub-layer supports a finite set of port widths. Specific port widths are supported as fundamental port widths, to allow for common targets for cable and chip design. The port widths include 1x, 4x, 8x, 12x, and 16x, where "x" identifies the number of physical lanes. Under some circumstances, such as detection of a defective lane, links may run at reduced lane widths.

Figures 3, 4:
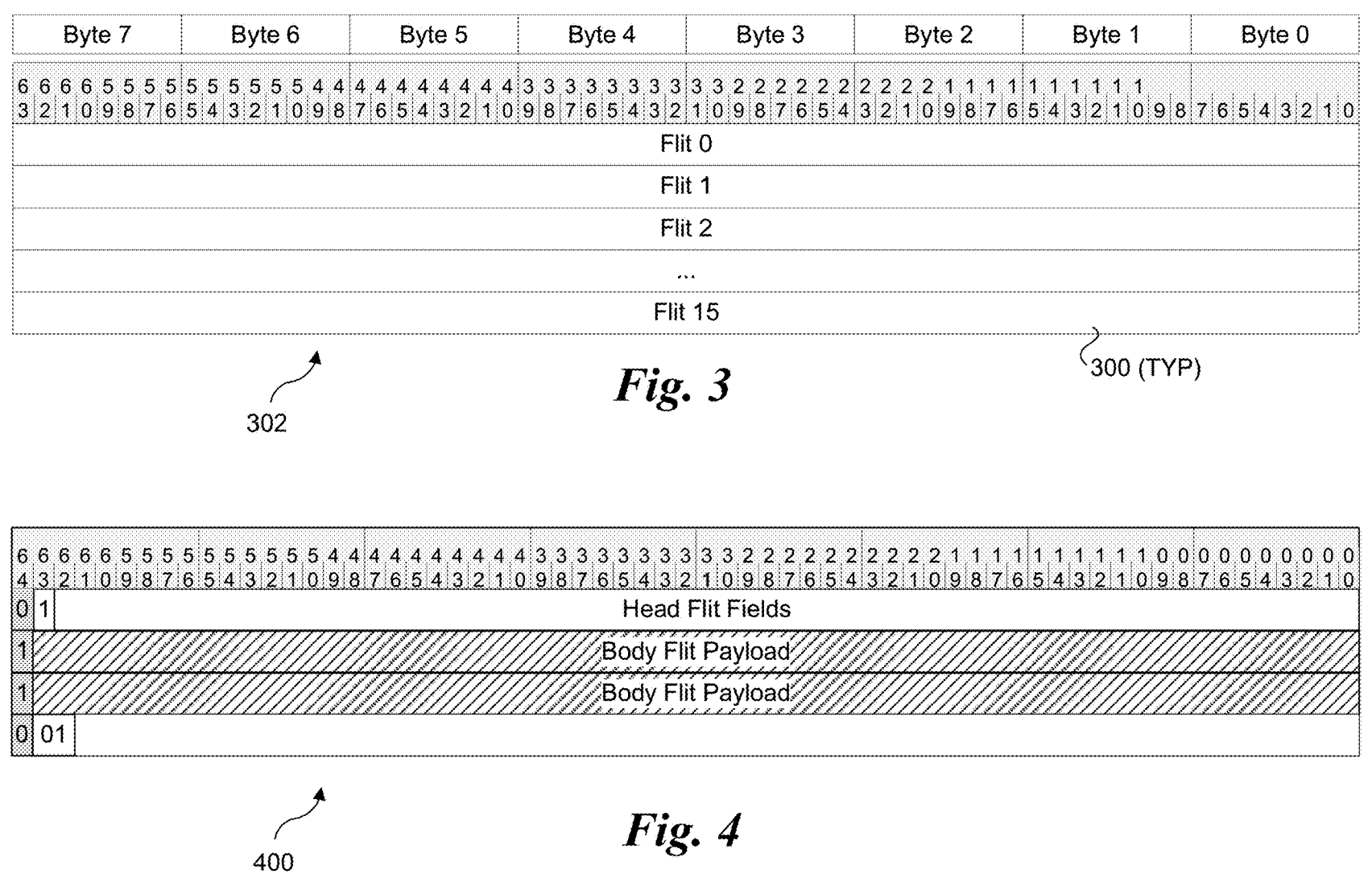

The Link Transfer Sub-Layer serves as the interface between the Physical Layer and the Link Fabric Sub-Layer. The link Fabric Packets (at the Link Fabric Sub-Layer) are segmented into 64-bit Flow Control Digits (FLITs, Flits, or flits, an approximate contraction of Flow Control Digits). FIG. 3 illustrates an example of a plurality of flits 300 grouped in a bundle 302. Each flit 300 includes 64 data bits comprising 8 bytes of data.

The Link Transfer Sub-Layer forms multiple lanes into teams that are capable of transferring flits and their associated credit return information across the link in a reliable manner. This is accomplished using 1056-bit bundles called Link Transfer Packets (LTPs), which are associated with the Link Fabric Sub-Layer. FIG. 3 also depicts the data portion of an LTP, which includes 16 flits of data. In addition, LTPs include flit type information, CRC data, and optional data (not shown in FIG. 3). Examples of LTPs are illustrated in various Figures (e.g., 5-8) and described below in further detail.

Fabric Packets are composed of 64-bit flits and a flit type bit for each flit. The first data flit of a Fabric Packet is called the Head flit. The last data flit of a Fabric Packet is called the Tail flit. Any other data flits in a Fabric Packet are called body flits. An example of a Fabric Packet 400 is illustrated in FIG. 4.

The flit type bit is provided with each flit to distinguish body flits from other flit types. In one embodiment, Body flits are encoded with the flit type bit set to 1, and contain 64 bits of data. All other flits are marked with the type bit set to 0. Head flits are encoded with flit[63] set to 1. All other (non body) flits are encoded with flit[63] set to 0. Tail flits are encoded with flit[62] set to 1. All other (non body/head) flits are encoded with flit[62] set to 0. Flit encoding is summarized in TABLE 1 below.

TABLE 1

| Flit Type Bit | Flit[63] | Flit[62] | Description |
| --- | --- | --- | --- |
| 1 | X | X | Body Data Flit |
| 0 | 0 | 0 | idle, bad packet, and control flits. |
| 0 | 0 | 1 | Tail Data Flit |
| 0 | 1 | X | Head Data Flit |

The control flits are summarized in TABLE 2. The seven control flits used solely by the link transfer layer (LT control Flits) are sent in null LTPs. The remaining control flits are divided into two groups. Fabric Packet (FP) flits include HeadBadPkt, BodyBadPkt and TailBadPkt control flits as well as the normal packet Head, Body, and Tail flits. Link Fabric (LF) command flits include Idle, VLMrkr and CrdtRet flits. FP flits and LF command flits can be intermingled together within reliable LTPs for transmission over the link.

TABLE 2

| Name | Generating | Sent in LTP | Flit Type | Description |
| --- | --- | --- | --- | --- |
| Idle | both | Reliable | LF Command | Idle. |
| VLMrkr | Link Fabric | Reliable | LF Command | VL Interleave marker. |

TABLE 2-continued

| Name | Generating | Sent in LTP | Flit Type | Description |
|---|---|---|---|---|
| CrdtRet | Link Fabric | Reliable | LF Command | VL credit return. |
| SPC | Link Fabric | Reliable | LF Command | Special Propose Command Flit |
| TailBadPkt | both | Reliable | Fabric Packet | Tail bad packet. |
| BodyBadPkt | both | Reliable | Fabric Packet | Body flit in a fabric packet had an unrecoverable error internal to device |
| HeadBadPkt | both | Reliable | Fabric Packet | Head flit in a fabric packet had an unrecoverable error internal to device |
| Null | Link Transfer | Single Null LTP | LT Control | Null. |
| RetryReq | Link Transfer | Null LTP Pair | LT Control | Retransmit request. |
| RetryMrkr0 | Link Transfer | Single Null LTP | LT Control | First Retransmission marker in Pair. |
| RetryMrkr1 | Link Transfer | Single Null LTP | LT Control | Second Retransmission marker in Pair. |
| RndTripMrkr | Link Transfer | Null LTP Pair | LT Control | Round trip marker. |
| RetrainRetryReq | Link Transfer | Null LTP Pair | LT Control | Retrain retransmit request. |
| LinkWidthReq0 | Link Transfer | Null LTP Pair | LT Control | First Link width request in pair. For power management. |
| LinkWidthReq1 | Link Transfer | Null LTP Pair | LT Control | Second Link width request in pair. For power management. |

An idle command flit is used by the link fabric layer when there are no Fabric Packet flits to insert into the data stream. If the full width of the data path contains idles the link transfer layer will remove them from the flit stream that is inserted into the input buffer. If the data path contains both idles and non-idle flits, the idles will not be removed. This is implemented in order for the link transfer layer to present the identical data path composition to the link fabric layer on the far side of the link. If the link transfer layer has no flits pending from the link fabric layer, it will insert idles as original flits are sent over the link. Original flits are flits sent over the link for the first time as opposed to those that are sent from a replay buffer which comprise retransmitted or replayed flits.

A link transfer packet holds sixteen flits for transmission over the link. Reliable LTPs are held in a replay buffer for period of time that is long enough to guarantee that a lack of a retransmit request indicates it has been received successfully by the link peer. Replay buffer location pointers are maintained for each LTP at the transmitter (NxtTxLTP) and receiver (NxtRxLTP) but are not exchanged as part of the LTP. When a transmission error is detected by the receiver, it sends a RetryReqLTP to the transmitter that contains the NxtRxLTP replay buffer location pointer. In response to receiving a RetryReqLTP, LTPs in the replay buffer are retransmitted in the original order, starting with the RetryReqLTP (peer NxtRxLTP) and ending with the last replay buffer location written (NxtWrLTP-1). Null LTPs are not held in the replay buffer and are not retransmitted.

Link Fabric command flits may be mixed with FP flits in an LTP; however, LF command flits are not part of a Fabric Packet. They carry control information from the Link Fabric sub-layer at one end of a link to the Link Fabric sub-layer at the other end of the link.

In one embodiment, there are three LTP formats, including a standard detection LTP, a 14-bit CRC LTP, and an enhanced Detection LTP. An embodiment of a standard detection LTP is shown in FIG. 5. In addition to the sixteen flits each standard detection LTP has a 16 bit CRC which covers the LTP contents. For illustrative purposes, the Flits in FIG. 5 are shown as 65 bits where bit 64 is the flit type bit.

An embodiment of a 14-bit CRC LTP is shown in FIG. 6. In addition to the sixteen flits, each 14-bit CRC LTP has a two bit credit sideband channel and a 14-bit CRC that covers the LTP contents. Flow control credits are transmitted within LTPs either in special LF command flits or in an LTP credit sideband channel.

In addition to the standard detection LTP, the link may also support an optional enhanced detection LTP holding sixteen flits and having four twelve bit CRC fields. FIG. 7 shows the format of an embodiment of the enhanced detection LTP. Each of the four CRC fields covers all sixteen flits. If any of the four CRCs are bad the LTP is retransmitted. There are two CRC calculation options for the four 12 bit CRCs. The first (48b overlapping) uses four overlapping calculations where each calculation covers all bits within the LTP. The second (12b-16b CRC per lane) uses four non-overlapping calculations where each calculation is limited to all the bits that flow on one of the four lanes.

As discussed above, LT control Flits used by the link transfer layer are sent in null LTPs. Null LTPs do not consume space in the replay buffer and are not retransmitted. They are distinguished using one of the link transfer LT control flits summarized in TABLE 2 above. Most of the null LTP types are sent in sequential pairs to guarantee that either at least one of the two is received by the link peer without an error or that a RetrainRetryReq will be automatically generated when they both have an error. An example of a standard detection null LTP is illustrated FIG. 8.

Standard detection null LTPs contain a single distinguishing control flit, 975 reserved bits and the standard detection sixteen bit CRC field. Enhanced detection null LTPs contain a single distinguishing control flit, 975 reserved bits and the enhanced detection four 12 bit CRC fields. The two sideband bits are ignored in a null LTP when using a 14 bit CRC.

As discussed above, the architecture employs three levels of data unit granularity to support data transfers: Fabric Packets, flits, and Link Transfer Packets. The unit of transmission at the Link Transfer Layer, is an LTP. As depicted, each LTP is nominally 16 flits long, and as described above the actual size of an LTP may vary depending on the particular CRC scheme that is used, and the use of referring to an LTP of having a length of 16 flits corresponds to the number of 64-bit flits of data contained in the LTP excluding the CRC bits and the 16 bit 65's.

Figure 9:
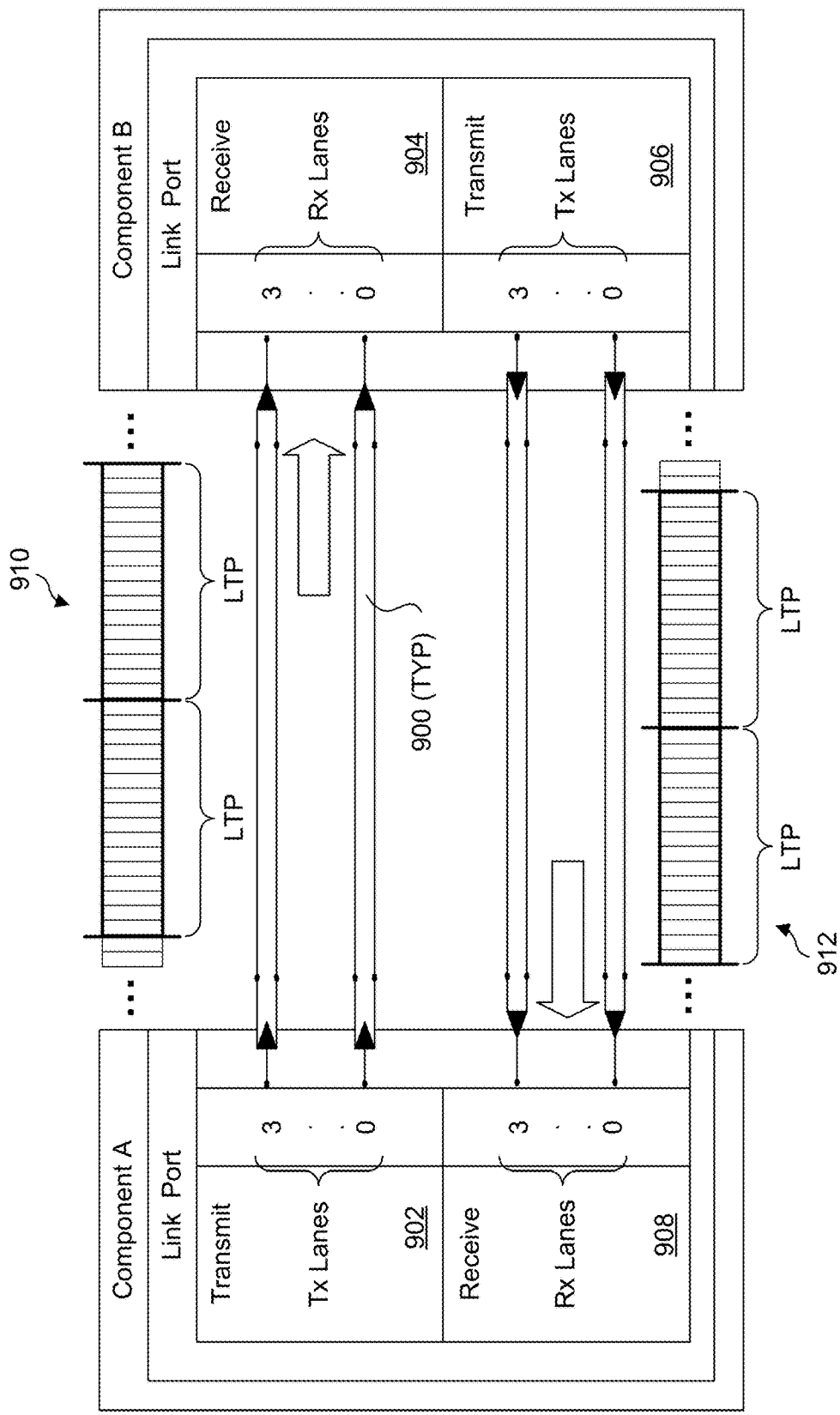
FIG. 9 a schematic diagram illustrating an example of bidirectional data transmission between two link ports employing 4 lanes, according to one embodiment.

The Physical layer (also referred to a "PHY") structure of one embodiment of a link comprising four physical lanes is illustrated in FIG. 9. The PHY defines the physical structure of the link interconnect and is responsible for dealing with details of operation of the signals on a particular link between two link peers, such as depicted by components A and B. This layer manages data transfer on the signal wires, including electrical levels, timing aspects, and logical issues involved in sending and receiving each bit of information across the parallel lanes. As shown in FIG. 9, the physical connectivity of each interconnect link is made up of four differential pairs of signals 900, comprising lanes 0-3 in each direction. Each port supports a link pair consisting of two uni-directional links to complete the connection between two peer components. This supports traffic in both directions simultaneously.

Components with link ports communicate using a pair of uni-directional point-to-point links, defined as link peers, as shown in FIG. 9. Each port comprises a Transmit (Tx) link interface and a Receive (Rx) link interface. For the illustrated example, Component A has a Tx port 902 that is connected to Component B Rx port 904. Meanwhile, Component B has a Tx port 904 that is connected to Component B Rx port 908. One uni-directional link transmits from Component A to Component B, and the other link transmits from Component B to Component A. The "transmit" link and "receive" link is defined relative to which component port is transmitting and which is receiving data. In the configuration illustrated in FIG. 9, the Component A transmit link transmits data from the Component A Tx port 902 to the Component B Rx port 904. This same Component A transmit link is the Port B receive link.

As previously stated, the fundamental unit for transfer of data between link ports is an LTP. Each LTP is specific to transmission in one direction over a specific link defined by a transmit port and a receive port at opposing ends of the link. An LTP has a lifetime of a single link transfer, and LTP's are dynamically generated by pulling flits from applicable VL buffers and assembling them, 16 at a time, into respective LTP's. As depicted by LTP transmit streams 910 and 912, LTPs are transmitted as a stream of flits, with the first and last flit for individual LTPs delineated by the head and tail flit bits, as discussed above with reference to FIG. 4.

As discussed above, the architecture defines a packet delivery mechanism primarily comprising destination-routed Fabric Packets, or FPs, with a Layer 4 payload size of 0 bytes to 10240 bytes. This provides efficient support for sending a range of messages from simple ULP acknowledgements to encapsulated Ethernet Jumbo Frames. Fabric Packets represent the logical unit of payload for upstream to and downstream from an HFI. Fabric packets are so named because they have a lifetime that is end-to-end in a fabric. More specifically, the lifetime of a Fabric Packet is the time it takes transfer of the FP content between fabric end points, as defined by source and destination addresses for the FP. Each transfer path of an FP will include transfer across at least one link, and may include transfer across multiple links when the transfer path traverses one or more switches.

Fabric Time Synchronization

In accordance with further aspects of the embodiments described herein, a mechanism is provided for synchronizing time clocks across a fabric in a manner that obtains an extremely high level of accuracy that is orders of magnitude more accurate than that currently obtained using IEEE 1588. The technique is inherently scalable, enabling the time-clocks of 10,000's or 100,000s of nodes to be synchronized with a single master clock. In addition, multiple master clocks may be implemented for further scalability.

There are several aspects that are key to implementation of the time synchronization mechanism. The first is the flit-based transmission of information across a link and the ability to mix control flits and packet flits in the flit stream. A Master Clock is used to propagate a Master Time to various end nodes (referred to as Slave nodes) coupled to the fabric via the use of special control flits (SPCs), rather than as a Fabric Packet. This means that when the Master Time information arrives at a transmit port of a switch, it can be injected on the link immediately at the next 8-byte flit boundary. There is no need to wait until the current packet has completed transmission. This minimizes the jitter in the propagation delay through the switch. Link Level retry, on error, could introduce significant jitter if the Time control flits were replayed. To avoid this, in one embodiment the Time control flits are simply dropped if they are delayed by a replay event, and the protocol is resilient to missing Time updates.

In one embodiment, the Master Time is a 64-bit value, while Control Flits can carry only a 48 bit payload. The Master Time is therefore carried in two independent flits, with one carrying the low 40 bits and one carrying the upper (high) 32 bits, with 8 bits overlapping. By carrying overlapping portions of the Time value the endpoints can determine if the two portions, which arrive independently, and either of which may be dropped along the way, are consistent with each other. This can also allow the upper portion of the Time value to be sent much less frequently than the lower portion of the Time value.

Unlike with conventional switches, the propagation of Time values through a switch uses a datapath that is independent of the crossbars and buffers used to propagate packets. In one instantiation the datapath is a multi-bit wide ring bus around the periphery of the switch chip. The port that is the source of Time for a switch, or which is the upstream port of the switch in the Clock Tree, removes the Time value from the Time control flit when it arrives at the port and injects the time value onto the ring bus. Ports that are downstream ports in the clock tree copy the Time value from the ring bus as it passes and then inject a corresponding Time control flit onto the link at a flit boundary. When the Time value arrives back at its source port it is removed from the ring. This provides a propagation path with a fixed, known latency from the upstream port to each downstream port.

At each destination node in the clock tree, the Time values are captured from the Control flits when they arrive, and saved in MasterTimeHigh and MasterTimeLow registers. When the flit carrying the low-order bits of the Time value arrives, the node also captures the value of the Local Clock in a LocalTime register. Software executing on the node can then read these registers. In one embodiment, hardware ensure that the values in the registers do not change during the sequence of reading the several registers, either through the use of shadow copies, or by inhibiting updates during the read sequence. The full 64-bit Master Time can be reconstructed from the two MasterTime registers, and can be adjusted by the known propagation delay from the Master Clock (which is calculated separately). This gives software the actual Master Time value at the time the Local Time was captured, providing an absolute Time synchronization across the fabric.

Figure 10A:
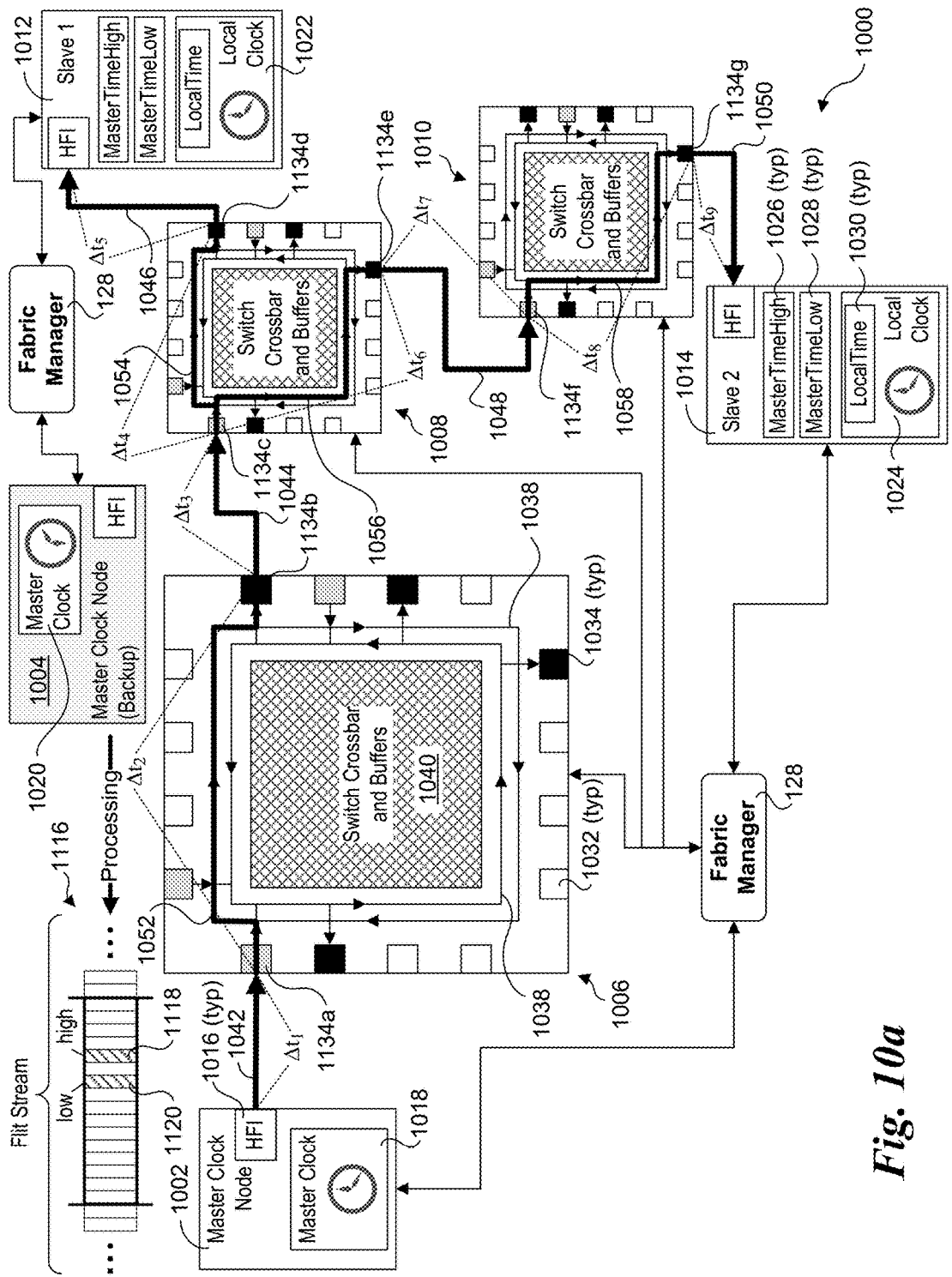
FIG. 10*a* is a schematic diagram illustrating an exemplary clock tree in a fabric in which the time synchronization is implemented, according to one embodiment.
Figure 10B:
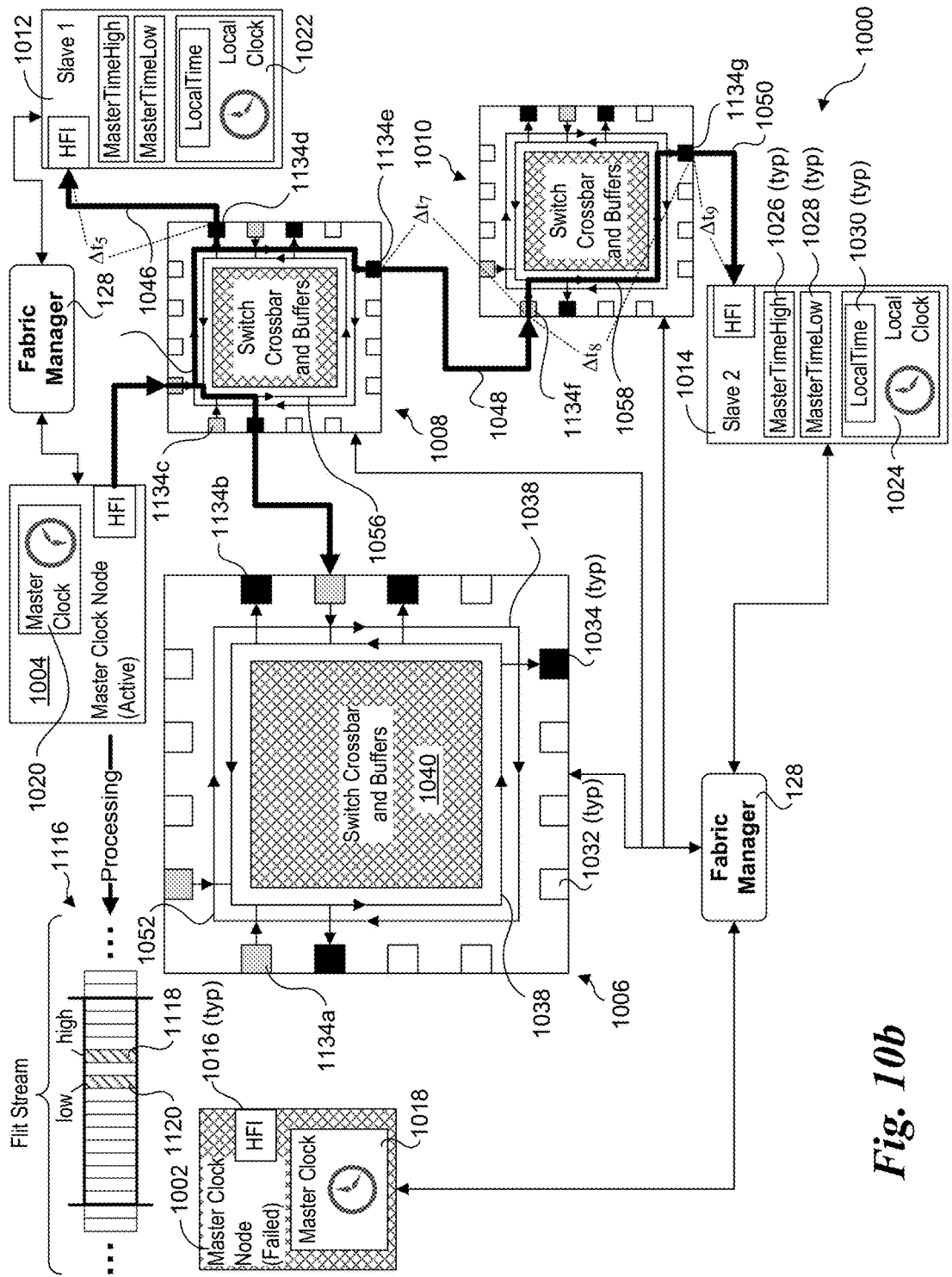
FIG. 10*b* is a schematic diagram showing an augmentation to FIG. 10*a* under which a backup Master Clock node has replaced an original Master Clock node.

FIGS. 10a and 10b illustrated an exemplary clock tree 1000 in which the time synchronization is implemented, according to one embodiment. The major components in clock tree 1000 include a master clock node 1002, a backup master clock node 1004, switches 1006, 1008, and 1010, and Slave nodes 1012 and 1014. One or more fabric managers 128 are also depicted, noting that two are shown so that communication links between the illustrated fabric managers and other components are not crossing. Generally, a clock tree may include one or more backup master clock nodes.

Each of the Master and Slave nodes includes a respective clock and an HFI 1016. Master clock node 1002 includes a Master Clock 1018, backup Master clock node 1004 includes a Master Clock 1020, Slave node 1012 includes a Local Clock 1022, and Slave node 1014 includes a Local Clock 1024. Each of Slave nodes 1012 and 1014 further includes a MasterTimeHigh register 1026, MasterTimeLow register 1028, and a LocalTime register 1030.

Each of switches 1006, 1008, and 1010 are similarly configured and include multiple fabric ports 1032, some of or all of which may be configured as clock ports 1034. A clock port is similar to a fabric port, with additional functionality to facilitate propagation of Master Clock data, as described below. For illustrative purposes, only four clock ports 1034 (shown in gray to differentiate from the other fabric ports); however, it will be understood that any number of fabric ports 1032 may be configured as a clock port. The upstream clock ports are depicted in gray, while the downstream clock ports are depicted in black in the Figures herein.

Figure 11A:
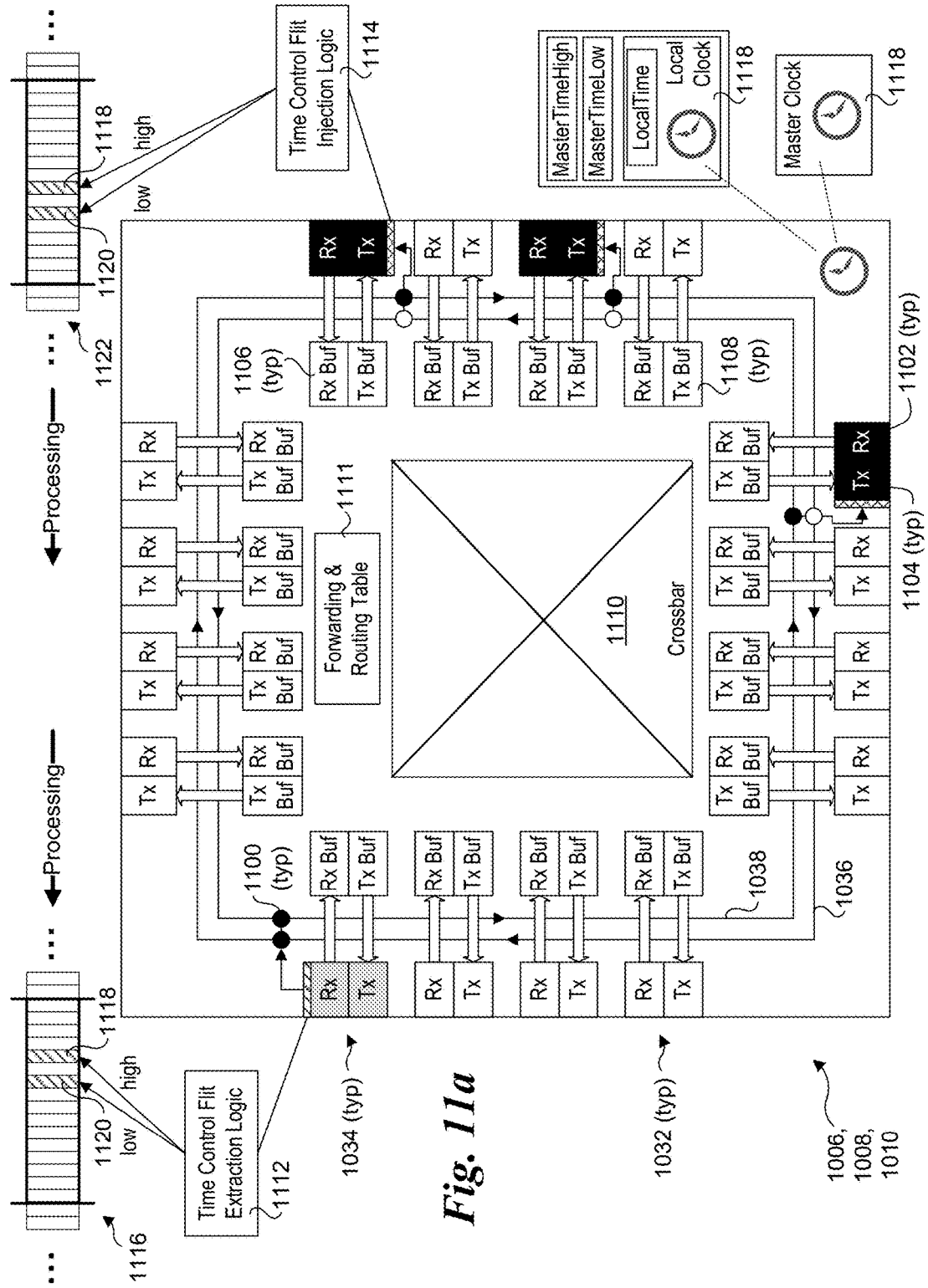
FIG. 11*a* is a schematic diagram of a switch configured to transfer clock data between upstream and downstream clock ports using a pair of ring buss proximate to the periphery of switch.
Figure 11B:
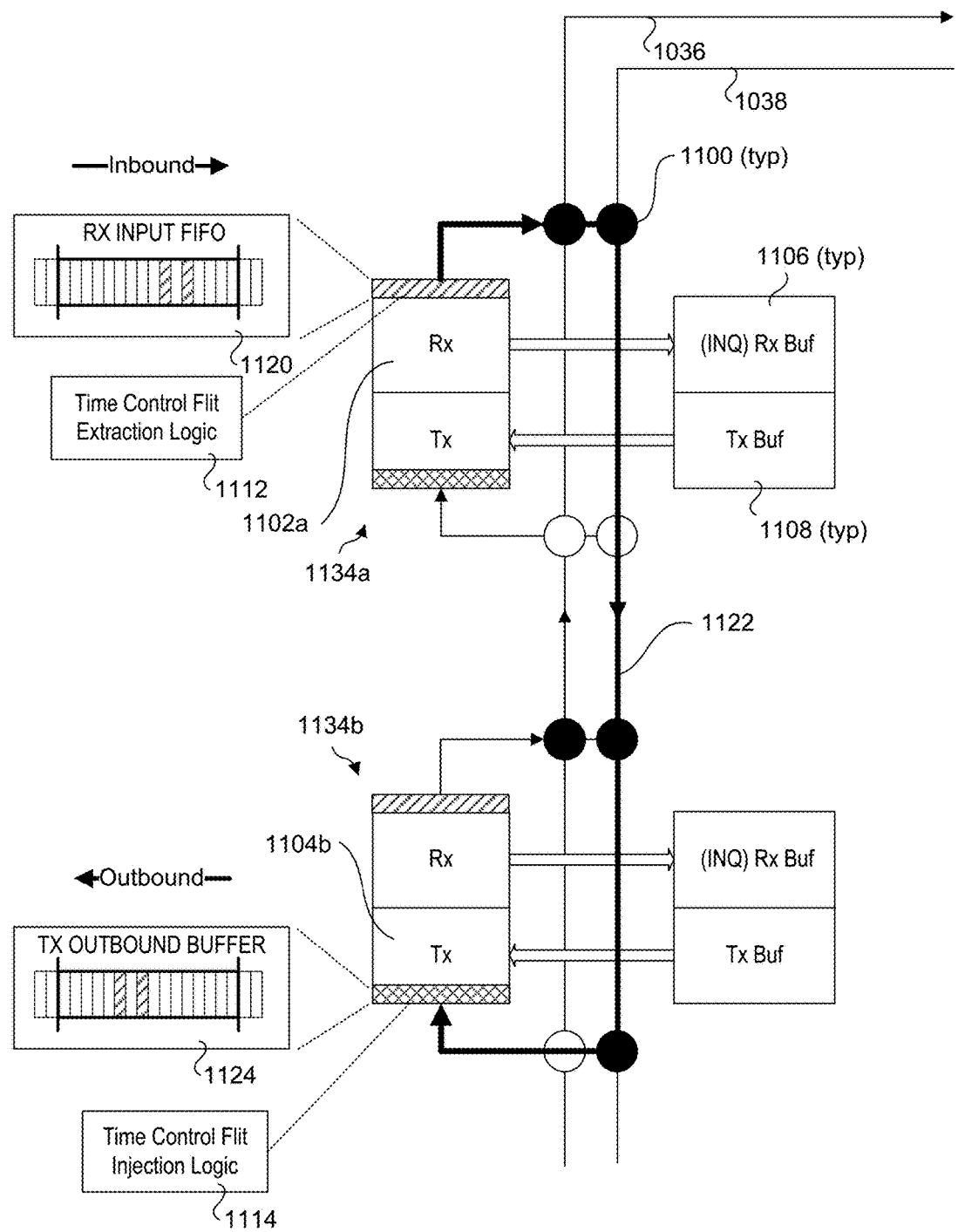
FIG. 11*b* is a schematic diagram showing further details of clock ports, according to one embodiment.

Further details of switches 1006, 1008, and 1010 are shown in FIGS. 11 and 11b. Each switch includes a pair of ring buses 1036 and 1038 (also referred to herein as "rings"). As illustrated, data is forwarded via ring 1036 in the clockwise direction, and via ring 1038 in a counter-clockwise direction. Each of rings 1038 includes a plurality of ring stop nodes 1100, a pair of which are provided at each clock port 1034.

Each port 1032 and clock port 1034 includes an Rx port 1102 and a Tx port 1104, each of which is respectively coupled to a Rx buffer 1106 and Tx buffer 1108. For a given port, each Rx buffer 1106 is selectively coupleable to each Tx buffer of another port via logic and circuitry for a crossbar interconnect 1110. For convenience and simplicity the combination of Rx buffers 1106, Tx buffers 1108 and crossbar interconnect 1110 are depicted in FIGS. 10a and 10b as switch crossbar and buffers 1040. In addition, each switch includes a forwarding and routing table 1111, which enables the switch to perform its normal fabric packet forwarding and routing.

Figure 12:
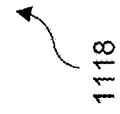
FIG. 12 is a diagram illustrating the format of MasterTimeHigh SPC flit, according to one embodiment.
Figure 13:
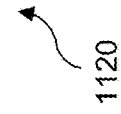
FIG. 13 is a diagram illustrating the format of MasterTimeLow SPC flit, according to one embodiment.

In one embodiment, all ports are clock ports that may be selectively configured to support upstream and downstream clock port functions. In one embodiment clock port 1034 includes Time control flit extraction logic 1112 and Time control flit injection logic 1114, each of which may be selectively enabled at each clock port by a fabric manager to form a clock tree. Time control flit extraction logic 1112 is implemented at an Rx port 1102 of an upstream clock port and is configured to identify and extract Time control flits from a flit stream 1116. The Time control flits include a MasterTimeHigh SPC flit 1118 and a MasterTimeLow SPC flit 1120. As shown in FIG. 12, a MasterTimeHigh SPC flit 1118 comprises a 65-bit flit in which the lowest four Bytes (Bytes 0-3) are used to store the upper 32 bits of the MasterTimeHigh Clock value. As shown in FIG. 13, a MasterTimeLow SPC flit 1120 comprises a 65-bit flit in which the lowest five Bytes (Bytes 0-4) are used to store the lower 40 bits of the MasterTimeLow Clock value. Accordingly, Byte 0 of MasterTimeHigh SPC flit 1118 and Byte 4 of MasterTimeLow SPC flit 1120 should contain the same value if the Time control flits are consistent with each other.

In one embodiment, Time control flit extraction logic 1112 extracts the 40-bits of a MasterTimeLow SPC flit (the MasterTimeLow data) or the 32-bits of the MasterTimeHigh SPC flit (the MasterTimeHigh data) and encapsulates the data (separately) in a packet and sends the data on rings 1036 and 1038. In another embodiment, the MasterTimeLow SPC flit or MasterTimeHigh SPC flit itself is encapsulated in the packet and sent on rings 1036 and 1038. During each ring-stop cycle, the data advances to the next ring stop node, eventually reaching a downstream clock port ring stop node, at which point Time control flit injection logic 1114 is enabled to copy the data off the ring, de-encapsulate the 40-bit MasterTimeLow data or 32-bit MasterTimeHigh data (as applicable), generate a new MasterTimeLow or MasterTimeHigh SPC flit, and inject the new flit into a flit stream 1118 that is currently being sent outbound from the Tx port associated with the Time control flit injection logic. In the embodiment that encapsulates entire MasterTimeLow and MasterTimeHigh SPC flits, the flits are extracted and injected in the flit stream without requiring generation of new MasterTimeLow and MasterTimeHigh SPC flits. As discussed above, these Time control flits may be immediately injected at the next 8-byte boundary in the flit stream.

The fabric switch may also implement a Local clock 1116 or a Master Clock 1118. In one embodiment, a fabric switch may be configured to perform the function of a Master Clock node, and is at the root of the Clock tree. In this instance, the fabric switch does not implement an upstream port. When the fabric switch is operating in a fabric that includes a separate Master Clock node, the switch's Local Clock 1116 may be synchronized in a similar manner as the Slave nodes, as described below.

FIG. 11b shows further details of a pair of clock ports 1134a and 1134b, which respectively are configured as an upstream clock port and a downstream clock port by a fabric manager. Each receive port 1102 includes an Rx input FIFO buffer 1120 in which a flits from a flit stream are buffered. A CRC value in each LTP is used to verify whether all flits in an LTP are received error-free. If not, a reliability mechanism is used that causes the LTP to be resent from the sender. After an LTP has been verified to have been successfully received, it is pushed out of Rx input FIFO buffer 1120 into a receive buffer 1106, which is further labeled "(INQ)", indicating the receive buffer functions as an input queue.

In addition, once an LTP has been successfully received, time control flit extraction logic 1112 extracts the MasterTimeLow SPC flits and MasterTimeHigh SPC flits and forwards them along a bypass circuit path, as depicted by a forwarding path 1122. Each receive port 1102 is connected to both of the ring buses 1036 and 1038. Meanwhile, the fabric manager selectively configures each Tx port 1104 of a downstream clock port so that is coupled to the ring bus that will result in the least latency when forwarding data from an upstream clock port to a downstream clock path. In the illustrated example, Tx port 1104b is selectively coupled to ring bus 1038. As will be observed, the use of a pair of ring buses reduces the bypath circuit length between some of the pair of upstream Rx and downstream Tx ports (as compared to using only a single ring). Upon receipt of the MasterTimeLow and MasterTimeHigh data (or flits, if flits are forwarded along the bypass circuit path), a corresponding flit is inserted into a Tx outbound buffer 1124 on Tx port 1104 and subsequently sent outbound onto the fabric to the next hop in the clock tree.

There are implementations where it would be useful to update the Time value in the Time control flit as it passes through a switch. If, for example, there was an unexpected delay in propagating the Time value through the switch, an implementation could increment the Time value by the amount of the unexpected delay rather than pass the Time value unchanged. For example, if the transmit port was in the middle of a Retry sequence the Time value could be updated and then sent after the retry was complete.

Figure 14:
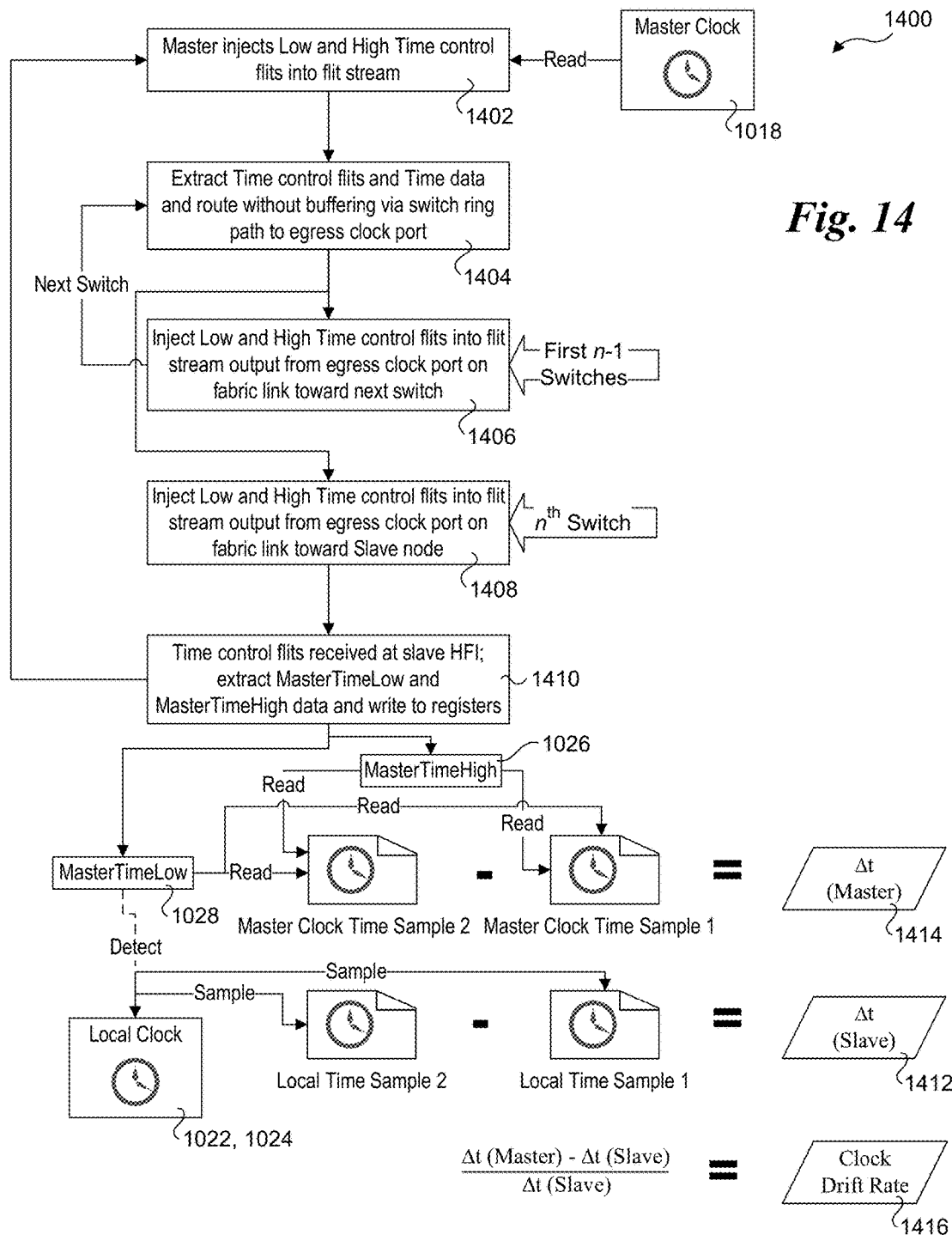
FIG. 14 is a flowchart illustrating operations and logic for determining a clock drift between a Master Node clock and a Local Clock on a Slave node, according to one embodiment.

With further reference to the flowchart 1400 of FIG. 14, determination of a clock rate mismatch for a Local Clock relative to Master Clock 1018 for clock tree 1000 in accordance with one embodiment is implemented as follows. As depicted by the outer loop, the following operations are performed in a cyclical fashion, such as on a periodic basis. In a block 1402, HFI 1016 or some other component on Master Clock node 1002 (not shown) reads Master Clock 1018 and generates and injects MasterTimeHigh and MasterTimeLow SPC flits 1118 and 1120 into a flit stream 1116 output from the Transmit (Tx) port of the HFI. As described above, the MasterTimeHigh SPC flit contains the MasterTimeHigh data, which comprises the upper 32 bits of the 64-bit clock data and the MasterTimeLow SPC flit contains the lower 40 bits the (MasterTimeLow data) of the 64-bit Master clock data. Also as discussed above, the use of an overlap enables the 8 bits common to both the Low and MasterTimeHigh SPC flits to be compared to verify the clock data is consistent. The result of block 1202 is to inject a MasterTimeHigh SPC flit 1118 and a MasterTimeLow SPC flit 1120 into flit stream 1116, which is transmitted toward a receive port for an upstream clock port 1134a on switch 1106, as shown in FIG. 10a. The MasterTimeHigh and MasterTimeLow SPC flits may be injected into the flit stream either as sequential pairs or in non-sequential slots in the flit stream. As described above, the MasterTimeHigh data does not need to be transmitted with each transmission of Time clock data, as this upper 32-bit value will not change over short time durations.

The operations of blocks 1404 and 1406 are performed at each switch in an overall Clock tree path between the Master Clock node and a given Slave node prior to the last switch in the path, in which case the operation of a block 1408 is performed rather than block 1406. For illustrative purposes, the number of switches is depicted as an integer n, where n can be one or more switches. If there is only one switch, the operation of block 1406 is skipped and there is no looping back to a next switch.

In block 1404, upon receipt by a receive (Rx) port of clock port 1134a configured as an upstream clock receive port (e.g., Rx port of clock port 1134a in FIGS. 10a and 10b), the Time control flits (MasterTimeHigh and MasterTimeLow SPC flits) are identified and the corresponding 32-bit MasterTimeHigh and 40-bit MasterTimeLow data is extracted. The MasterTimeHigh and MasterTimeLow data (as applicable) is then sent around each of rings 1036 and 1038, sequentially advancing to each ring stop node until traversal of each ring is completed. Optionally, the MasterTimeHigh and MasterTimeLow SPC flits themselves are sent around rings 1036 and 1038. As shown in block 1406, for each switch along the Clock tree path that has a switch as the next hop, MasterTimeHigh and MasterTimeLow SPC flits (as applicable) are injected into the flit stream at the Tx port of the downstream clock port that is used to send the Master Clock data to the next switch in the Clock tree. A similar operation is performed in block 1208 for the last switch along the Clock tree path to a destination Slave node rather than a next switch. The corresponding downstream clock ports depicted in FIGS. 10a and 10b include a downstream clock port 1134b for switch 1006, downstream clock ports 1134d and 1134e for switch 1008, and a downstream clock port 1134g for switch 1010.

Continuing at a block 1410, upon receipt of the MasterTimeHigh and MasterTimeLow SPC flits at a Slave node's HFI, the MasterTimeHigh and MasterTimeLow data is extracted and written to MasterTimeHigh register 1026 and MasterTimeLow register 1028, respectively. In one embodiment, each of these registers can store multiple samples MasterTimeHigh and MasterTimeLow data. Optionally, each register stores a single sample that is read by software or firmware upon being stored in the register. In conjunction with the write to MasterTimeLow register 1028, as detected by logic on the Slave node, a first sample of the Local Clock at the Slave node (e.g., Local Clock 1022 for Slave node 1012 and Local Clock 1024 for Slave node 1014) is taken and the corresponding Local Time sample is stored in LocalTime Register 1030. In conjunction with a subsequent write to MasterTimeLow register 1028 (which would occur during the next cycle), a second sample of the Local Clock is taken, and the difference between the first and second Local Clock samples is calculated as a $\Delta t_{Slave}$ 1212. Meanwhile, respective samples of the MasterTimeHigh and MasterTimeLow values are read from MasterTimeHigh register 1026 and MasterTimeLow register 1028 to generate successive Master Clock time samples to calculate a $\Delta t_{Master}$ 1214. Optionally, a second MasterTimeLow value is subtracted from a first MasterTimeLow value to calculate a $\Delta t_{Master}$ 1214.

The difference between $\Delta t_{Master}$ and $\Delta t_{Slave}$, divided by $\Delta t_{Slave}$ is then calculated to determine a clock rate mismatch 1216 between the Master and Local (Slave) clocks for the given time period between samples. For example, in one embodiment, the outer loop of flowchart 1200 is repeated approximately 10 times per second on a periodic basis, and thus the clock rate mismatch would be measured over $\frac{1}{10}^{th}$ of a second (or whatever time period of periodicity is used). In one embodiment, LocalTime register 1030 is configured to store multiple Local Clock samples, and the difference between successive receipts of Master Clock data can be precisely calculated (down to the granularity level of the Local Clock, e.g., on the order of a few nanoseconds).

Figure 15:
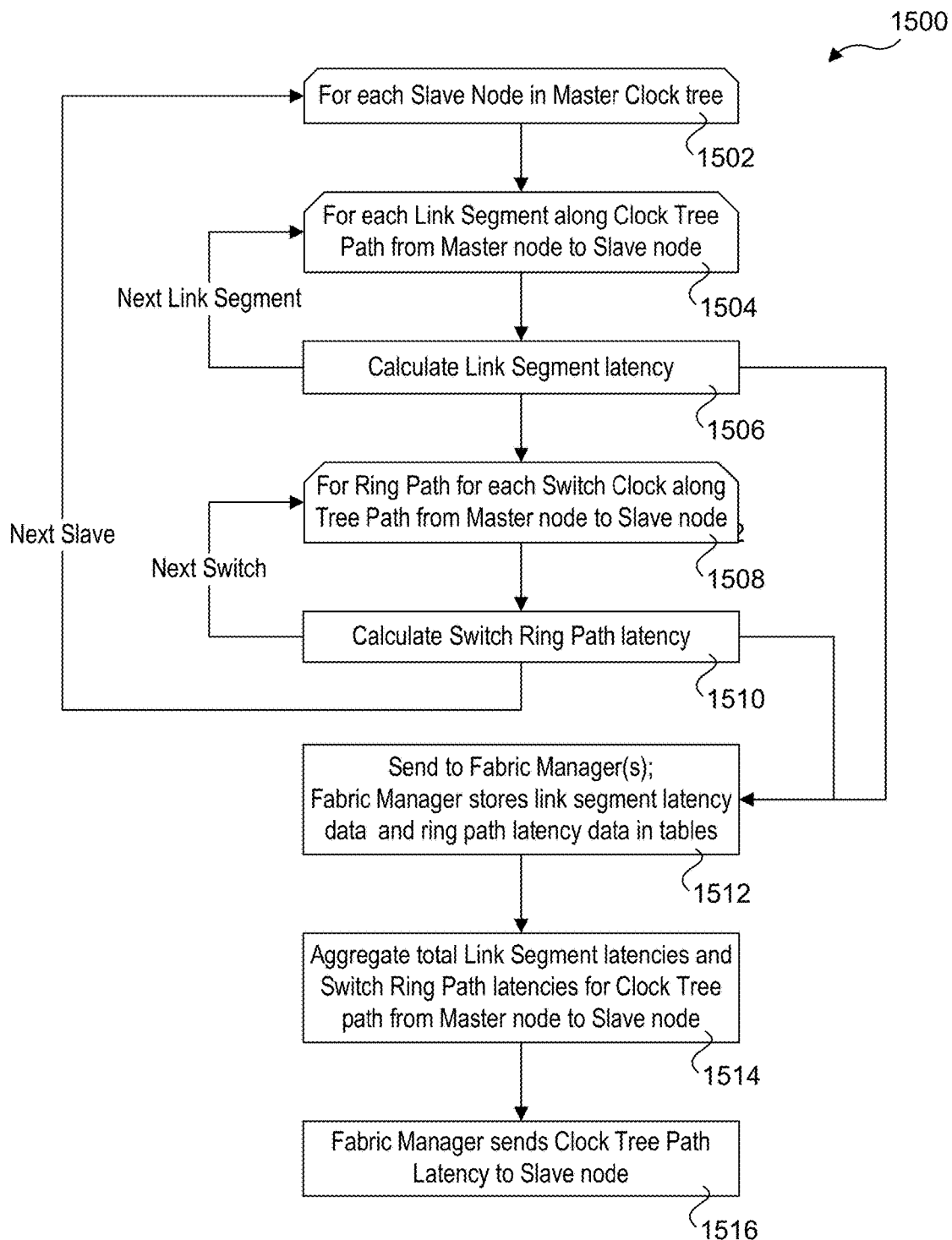
FIG. 15 is a flowchart illustrating operations and logic for calculating Clock Tree path latencies, according to one embodiment.

In addition to determining clock rate mismatches for each Slave node's clock relative to the Master node's clock, the Slave node clocks are synchronized with the Master Clock. Operations for implementing one embodiment of this process are shown in a flowchart 1500 of FIG. 15. As shown by a loop start block 1502, and corresponding outer loop, the operations of flowchart 1500 are performed for each Slave node in a Master Clock tree.

As depicted in start loop block 1504 and a block 1506, the link segment latency for each fabric link segment in the Clock Tree path is calculated. In one embodiment this is done by measuring a time duration to complete a round trip path over a given link segment and then subtracting the portion of the time consumed by processing at both ends of the link. In one embodiment, the latency for each leg segment in the Master Clock tree is calculated at an originating fabric port (e.g., an downstream clock port on a switch), and the resulting calculation is sent to one or more Fabric Manager(s), which stores the information in a link segment latency table or the like, as depicted in a block 1512. An exemplary set of link segments for the Master Clock tree path from Master Clock node 1002 to Slave node 1012 includes link segments 1042, 1044, and 1046, with corresponding link segment latencies depicted as $\Delta t_1$, $\Delta t_3$, and $\Delta t_5$, respectively. The Master Clock tree path from Master Clock node 1002 to Slave node 1014 includes link segments 1042, 1044, 1048 and 1050, with corresponding link segment latencies depicted as $\Delta t_1$, $\Delta t_3$, $\Delta t_7$, and $\Delta t_9$, respectively.

Next, as depicted by a start loop block 1508 and a block 1510, the switch ring path latency is calculated at each switch along the Master Clock tree path. This calculation may be performed in several manners, including taking latency time measurements between ring stop nodes on a switch, and calculating the latency using a modeling tool used to design the circuitry in a switch. Generally, for a given switch configuration these measurements would only need to be performed once (or multiple times and averaged) prior to installing the switch in the fabric. Some switches may be configured to operate at more than one Ring clock frequency, and thus may require testing at each supported Ring clock frequency. Upon determining a ring path latency calculation (or a set of calculations for a switch), the corresponding ring path and latency data is sent to one or more Fabric Managers, which stores the data in a ring path latency table or the like, as depicted by block 1512.

In FIGS. 10a and 10b, exemplary ring paths and latency measurements are shown for switch 1006 (ring path 1052 and latency $\Delta t_2$), switch 1008 (ring paths 1054 and 1056 and latencies $\Delta t_4$ and $\Delta t_6$), and switch 1010 (ring path 1058 and latency $\Delta t_8$). Similar latencies would be calculated for other ring paths in each switch. As before, this information is sent to a Fabric Manager (e.g., Fabric Manager 128), which stores the ring path latency data in a table or the like.

In a block 1514, the aggregate total of the link segment latencies and switch ring path latencies for a given Clock tree path from the Master node to each Slave node is calculated, as follows:

$$\text{Total Clock Tree Path Latency} = \Sigma \Delta t(\text{Link Segments}) + \Delta t(\text{Switch Ring Paths}) \quad (1)$$

The Fabric Manager then sends the Clock Tree path latency to each Slave node, as shown in a block 1516. In one embodiment, this information is stored as a ClockOffset on the Slave node, either in LocalTime register 1030 or a separate ClockOffset register 1602 (see FIG. 16, not shown in FIGS. 10a and 10b for clarity).

Figure 16:
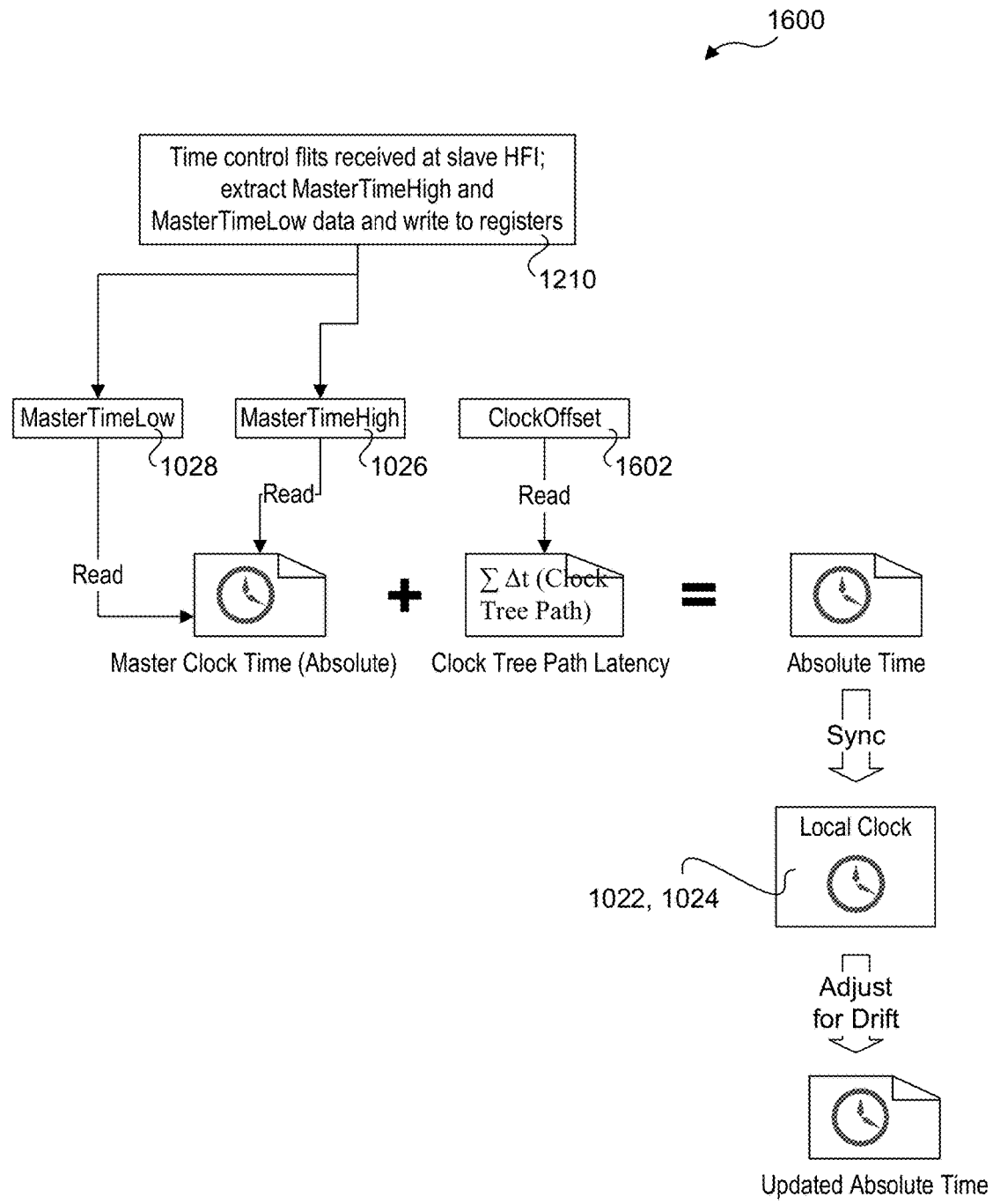
FIG. 16 is a flowchart illustrating operations for performing a clock synchronization between a Master Clock and a Local Clock, and further illustrating an update to the synchronized clocks using the clock drift determined via the flowchart of FIG. 14.

FIG. 16 shows a diagram 1600 depicting operations performed at each Slave node to synchronize its Local Clock with the Master Clock. As before, the MasterTimeHigh and MasterTimeLow data is extracted in block 1210 and written to MasterTimeHigh and MasterTimeLow registers 1026 and 1028. A corresponding 64-bit Master Clock Time is determined. In one aspect, the Master Clock time is considered an Absolute Time value at the time it is sampled at the Master Clock. The ClockOffset value corresponding to the total Clock tree path latency from the Master node to the Slave node is then added to the Master Clock Time to obtain the Absolute Time at the Slave node. The Slave node's local clock is then synced to the Master Clock. Given a known clock mismatch rate, various techniques may be employed to sync the Slave's clock to the Master Clock, such as but not limited to techniques described in IEEE 1588.

FIG. 16 shows a diagram 1600 depicting operations performed at each Slave node to synchronize its Local Clock with the Master Clock. As before, the MasterTimeHigh and MasterTimeLow data is extracted in block 1210 and written to MasterTimeHigh and MasterTimeLow registers 1026 and 1028. A corresponding 64-bit Master Clock Time is determined. In one aspect, the Master Clock time is considered an Absolute Time value at the time it is sampled at the Master Clock. The ClockOffset value corresponding to the total Clock tree path latency from the Master node to the Slave node is then added to the Master Clock Time to obtain the Absolute Time at the Slave node. The Slave node's local clock is then synced to the Master Clock. Given a known clock mismatch rate, various techniques may be employed to sync the Slave's clock to the Master Clock, such as but not limited to techniques described in IEEE 1588.

Under some circumstances, it may be necessary to replace the current Master Clock node with another Master Clock node. For example, this situation is shown in FIG. 10b, wherein Master Clock node 1002 has failed (or is otherwise unavailable to support Master Clock operations) and has been replaced by Master Clock backup node 1004. The HFI of the (now) Master Clock node 1004 is connected to upstream clock port 1134a of switch 1006 via a link segment 1052, with the corresponding link segment latency depicted as $\Delta t_{10}$.

It is noted that a replacement Master Clock node need not connect to the same switch as a previous Master Clock node. Rather, a Master Clock node could be connected to various fabric switches. In addition, when a new Master Clock node is implemented the latencies for the Clock Treed paths from the Master Clock node to each Slave node total latencies will generally need to be recalculated.

The embodiments disclosed herein provide significant improvement over existing art. For example, the fabric time synchronization mechanism and protocol provides orders of magnitude better accuracy than software-only solutions. The IEEE 1588 approach for Ethernet and the PTM approach for PCIe assume that the propagation delay for the Master Clock information can vary each time the information is sent, based on varying degrees of congestion in the fabric. These protocols attempt to measure the actual propagation delay by sending responses and measuring round trip delays. This requires complex logic, or a firmware-based protocol controller, in switches to implement the calculations at each hop.

The Master Clock synchronization protocol described herein use a dedicated bypass data path within the switches to provide a known propagation delay (latency) from the source of the Master Time information to all downstream switch ports that are part of the defined Clock tree. This protocol can deliver much better accuracy because there is much less variation in propagation delay from one Master Time sample to another.

Further aspects of the subject matter described herein are set out in the following numbered clauses:

1. A method performed in an environment including a master clock node communicatively coupled to a plurality of slave nodes via a fabric comprising a plurality of fabric switches and a plurality of fabric links, comprising:

forwarding master clock time data generated by a master clock operating on the master clock node to each of the plurality of slave nodes via clock tree paths having fixed latencies;

for a given slave node, determining the fixed latency of the clock tree path from the master clock node to the slave node; and synchronizing a local clock for the slave node and the master clock operating on the master clock node using the master clock time data received by the slave node and the fixed latency of the clock tree path from the master clock node to the slave node that is determined, wherein, for at least a portion of the slave nodes, the clock tree paths from the master clock node to those slave nodes traverse multiple fabric switches.

2. The method of clause 1, wherein each of the multiple fabric switches that are traversed for a given forwarding path between the master clock node and a slave node comprises:

a plurality of ports, each including a receive port operatively coupled to a receive buffer and a transmit port operative coupled to a transmit buffer;

switching circuitry that, during operation, enables selectable connection between a receive buffer of a first port and a transmit buffer of a second port;

at least one bypass circuit path between a receive port of an upstream clock port and a transmit port of a downstream clock port that enables data received at the receive port to be forwarded to the transmit port along a bypass circuit path.

3. The method of clause 2, wherein the at least one circuit path comprises a ring bus to which at least a portion of the receive ports and transmit ports are operatively coupled.

4. The method of clause 2 or 3, wherein the at least one circuit path comprises first and second ring buses to which at least a portion of the receive ports and transmit ports are operatively coupled, wherein data is forwarded in a clockwise direction for the first ring bus and data is forwarded in a counterclockwise direction for the second ring bus, and wherein the data is forwarded along one of the first and second ring buses based on which ring bus results in the least latency.

5. The method of any of the preceding clauses, wherein a clock tree path between a master clock node and a slave node traverses a plurality of fabric switches and a plurality of link segments linking the plurality of fabric switches in communication, and where determining the fixed latency of a clock tree path comprises:

determining a latency for each of the plurality of link segments;

determining a switch forwarding latency from an upstream clock port to a downstream clock port within each of the plurality of fabric switches, wherein the clock tree path includes a first link segment coupled to the upstream clock port and a second link segment coupled to the downstream clock port; and aggregating the latencies for each of the plurality of link segments and the switch forwarding latencies.

6. The method of any of the preceding clauses, wherein data is transferred across the plurality of fabric links using a stream of flow control units (flits), and wherein the master clock time data is contained within at least one flit that is forwarded along the clock tree paths from the master clock node to the plurality of slave nodes.

7. The method of clause 6, wherein the master clock time data is contained in first and second flits, the first flit comprising an upper bit portion of the master clock time data and the second flit containing a lower bit portion of the master clock time data.

8. The method of clause 7, wherein a portion of the upper bit portion of the master clock time data in the first flit and the lower bit portion of the master clock time data in the second flit are overlapping, further comprising comparing the master clock time data bits in overlapping portion to determine that the upper bit portion and lower bit portion of the master clock time data is consistent.

9. The method of clause 6, further comprising:

receiving a flit stream comprising a stream of flits at a receive port of an upstream clock port of a fabric switch, the receive port having an associated receive buffer;

detecting that a first plurality of flits in the flit stream contain data corresponding to fabric packets;

storing the first plurality of flits in a receive buffer for the receive port;

detecting that a flit in the flit stream corresponds to a Time control flit containing master clock time data;

extracting the master clock time data from the Time control flit;

forwarding the master clock time data from the receive port to a downstream clock port in the fabric switch along a bypass circuit path;

encapsulating the master clock time data in a new Time control flit generated at a transmit port of the downstream clock port; and injecting the new Time control flit into a flit stream that is sent outbound onto a fabric link from the transmit port;

10. The method of clause 6, further comprising:

receiving a flit stream comprising a stream of flits at a receive port of an upstream clock port of a fabric switch, the receive port having an associated receive buffer;

detecting that a flit in the flit stream corresponds to a Time control flit containing master clock time data;

forwarding the Time control flit from the receive port to a downstream clock port in the fabric switch without buffering the Time control flit in the receive buffer associated with the receive port; and injecting the Time control flit into a flit stream that is sent outbound onto a fabric link from a transmit port of the downstream clock port.

11. The method of clause 6, wherein, for each slave node, the at least one flit containing the master clock time data is forwarded along a clock tree path from the master clock node to the slave node in a manner that guarantees data integrity of the master clock time data forwarded to the slave node.

12. The method of any of the preceding clauses, further comprising determining a clock rate mismatch between the master clock and a local clock on a slave node.

13. The method of clause 12, wherein determining the clock rate mismatch between the master clock and the local clock comprises:

receiving first master clock time data at the slave node;

storing a first master clock time sample corresponding to the first master clock time data at the slave node;

in conjunction with receiving the first master clock time data, storing a first sample of the local clock at the slave node;

receiving second master clock time data at the slave node;

storing the second master clock time data at the slave node;

in conjunction with receiving the second master clock time data, storing a second sample of the local clock at the slave node;

subtracting the first master clock time data from the second master clock time data to obtain a master clock time sample difference;

subtracting the first sample from the second sample of the local clock to obtain a time difference for the local clock time sample difference; and subtracting the local clock time sample difference from the master clock time sample difference and dividing the result by the local clock time sample difference to obtain the clock rate mismatch.

14. The method of any of the preceding clauses, further comprising:
replacing a master clock node with a new master clock node; and
forwarding master clock time data generated by a master clock operating on the new master clock node to each of the plurality of slave nodes via clock tree paths having fixed latencies;
for a given slave node, determining the fixed latency of the clock tree path from the new master clock node to the slave node; and
synchronizing a local clock for the slave node and the master clock at the new master clock node using the master clock time data received by the slave node and the fixed latency of the clock tree path from the master clock node to the slave node that is determined.

15. The method of any of the preceding clauses, further comprising implementing the master clock in a fabric switch.

16. A fabric switch, comprising:
a plurality of ports, each including a receive port operatively coupled to a receive buffer and a transmit port operative coupled to a transmit buffer, at least one port comprising an upstream clock port and at least one port comprising a downstream clock port;
switching circuitry that, during operation, enables selectable connection between a receive buffer of a first port and a transmit buffer of a second port;
at least one bypass circuit path between a receive port of an upstream clock port and a transmit port of a downstream clock port that enables master clock time data received at the receive port of the upstream clock port to be forwarded to the transmit port of the downstream clock port in a manner that bypasses the receive buffer for the receive port, and the transmit buffer for the transmit port.

17. The fabric switch of clause 16, wherein the at least one circuit path comprises at least one ring bus having a plurality of ring node stops including respective ring node stops operatively coupled to each of the at least one upstream clock port and each of the at least one downstream clock port.

18. The fabric switch of clause 17, wherein the fabric switch is configured to be implemented in a fabric that transfers data along fabric links in a stream of flow control units (flits) comprising flit streams, and the fabric switch is further configured to:
receive a flit stream at an upstream clock port;
detect a Time control flit in the flit stream;
extract master clock time data from the Time control flit;
forward the master clock time data along a first ring bus; and
at each of multiple ring stop nodes on the first interconnect;
encapsulate a copy of the master clock time data in a new Time control flit; and
inject the new Time control flit into a flit stream sent outbound onto a fabric link from the downstream clock port to which the ring stop node is coupled.

19. The fabric switch of clause 17 or 18, wherein the fabric switch is configured to be implemented in a fabric that transfers data along fabric links in a stream of flow control units (flits) comprising flit streams, and the fabric switch is further configured to:
receive a flit stream at an upstream clock port;
detect a Time control flit in the flit stream;
forward the Time control flit along a first ring bus; and
at each of multiple ring stop nodes on the first interconnect;
inject a copy of the Time control flit into a flit stream sent outbound onto a fabric link from the downstream clock port to which the ring stop node is coupled.

20. The fabric switch of any of clauses 17-19, wherein the fabric switch is configured to be implemented in a fabric that transfers data along fabric links in a stream of flow control units (flits) comprising flit streams, wherein the master clock time data is contained in first and second flits, the first flit comprising an upper bit portion of the master clock time data and the second flit containing a lower bit portion of the master clock time data.

21. The fabric switch of clause 20, wherein each upstream clock port is configured to detect errors in the flit stream and the fabric switch is configured to prevent errant Time control flits from being forwarded from an upstream clock port to a downstream clock port.

22. The fabric switch of any of clauses 16-21, wherein the at least one circuit path comprises first and second ring busses, each having a plurality of ring node stops including respective ring node stops operatively coupled to each of the at least one upstream clock port and each of the at least one downstream clock port, wherein data is forwarded along the first ring bus in a clockwise direction and data is forwarded along a second ring bus in a counter-clockwise direction.

23. The fabric switch of any of clauses 16-22, wherein each of the plurality of ports is selectively configurable to operate as, one at a time, an upstream clock port and a downstream clock port.

24. The fabric switch of any of clauses 16-23, further comprising circuitry for implementing a master clock.

25. The fabric switch of any of clauses 16-24, further comprising circuitry for implementing a local clock and syncing the local clock to a master clock.

26. The fabric switch of any of clauses 16-24, wherein the fabric switch is configured to be implemented in a fabric that transfers data along fabric links in a stream of flow control units (flits) comprising flit streams, the fabric switch further comprising:
Time control flit extraction logic at each of the at least one upstream clock port, configured to extract Time control flits from a received flit stream comprising master clock time data and forward master time data contained in an extracted Time control flit along a bypass circuit path between the upstream clock port and at least one downstream clock port.

27. The fabric switch of clause 26, further comprising:
Time control flit injection logic at each of the at least one downstream clock ports, configured to receive master time data forwarded from an upstream clock port along the bypass circuit path, generate a new Time control flit, and inject the new Time control flit into a flit stream sent outbound onto a fabric link from the downstream clock port.

28. The fabric switch of any of clauses 16-24, wherein the fabric switch is configured to be implemented in a fabric that transfers data along fabric links in a stream of flow control units (flits) comprising flit streams, the fabric switch further comprising:
Time control flit extraction logic at each of the at least one upstream clock port, configured to extract Time control flits from a received flit stream comprising master clock time data and forward an extracted Time control flit along a bypass circuit path between the upstream clock port and at least one downstream clock port.

29. The fabric switch of clause 28, further comprising:

Time control flit injection logic at each of the at least one downstream clock ports, configured to receive a Time control flit forwarded from an upstream clock port along the bypass circuit path, and inject the Time control flit into a flit stream sent outbound onto a fabric link from the downstream clock port.

30. A system comprising:

a master clock node having a master clock and including a host fabric interface (HFI);

a plurality of slave nodes, each including a local clock and including an HFI;

a plurality of fabric switches, each including, a plurality of ports, each including a receive port operatively coupled to a receive buffer and a transmit port operative coupled to a transmit buffer, at least one port comprising an upstream clock port and at least one port comprising a downstream clock port;

switching circuitry that, during operation, enables selectable connection between pairs of receive buffers and transmit buffers of different ports;

at least one bypass circuit path between the at least one upstream clock port and the at least one downstream clock port; and a plurality of fabric links interconnect ports on the plurality of fabric switches, the master clock node, and the plurality of slave nodes, wherein during operation of the system the master clock node generates master clock time data that is forwarded to each of the slave nodes via a clock tree path having a fixed latency, wherein each clock tree path traverses the bypass circuit path for at least one fabric switch and a plurality of fabric links.

31. The system of clause 30, wherein each fabric switch is configured to forward master clock time data along the at least one bypass circuit path in a manner that bypasses the receive buffers, the transmit buffers, and the switching circuitry.

32. The system of clause 31, wherein the system performs operations to facilitate synchronization of the local clocks on the slave nodes with the master clock comprising:

forwarding master clock time data generated by the master clock to each of the plurality of slave nodes via a respective clock tree path having fixed latency;

for each slave node, determining the fixed latency of the clock tree path from the master clock node to the slave node; and synchronizing a local clock for the slave node and the master clock operating on the master clock node using the master clock time data received by the slave node and the fixed latency of the clock tree path from the master clock node to the slave node that is determined, 33. The system of clause 32, wherein the system is further configured to:

determine a clock rate mismatch of the local clock on each slave node relative to the master clock; and employ the clock rate mismatch determined for each local clock to maintain synchronization between the master clock and each local clock.

34. The system of any of clauses 30-33, wherein the system is further configured to guarantees data integrity of the master clock time data forwarded to each slave node.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed in an environment including a master clock node communicatively coupled to a plurality of slave nodes via a fabric comprising a plurality of fabric switches and a plurality of fabric links, comprising:

forwarding master clock time data generated by a master clock operating on the master clock node to each of the plurality of slave nodes via clock tree paths having fixed latencies;

for a given slave node, determining the fixed latency of the clock tree path from the master clock node to the slave node; and synchronizing a local clock for the slave node and the master clock operating on the master clock node using the master clock time data received by the slave node and the fixed latency of the clock tree path from the master clock node to the slave node that is determined, wherein, for at least a portion of the slave nodes, the clock tree paths from the master clock node to those slave nodes traverse multiple fabric switches.

2. The method of claim 1, wherein each of the multiple fabric switches that are traversed for a given forwarding path between the master clock node and a slave node comprises:

a plurality of ports, each including a receive port operatively coupled to a receive buffer and a transmit port operative coupled to a transmit buffer;

switching circuitry that, during operation, enables selectable connection between a receive buffer of a first port and a transmit buffer of a second port;

at least one bypass circuit path between a receive port of an upstream clock port and a transmit port of a downstream clock port that enables data received at the receive port to be forwarded to the transmit port along a bypass circuit path.

3. The method of claim 2, wherein the at least one circuit path comprises a ring bus to which at least a portion of the receive ports and transmit ports are operatively coupled.

4. The method of claim 2, wherein the at least one circuit path comprises first and second ring buses to which at least a portion of the receive ports and transmit ports are operatively coupled, wherein data is forwarded in a clockwise direction for the first ring bus and data is forwarded in a counterclockwise direction for the second ring bus, and wherein the data is forwarded along one of the first and second ring buses based on which ring bus results in the least latency.

5. The method of claim 1, wherein a clock tree path between a master clock node and a slave node traverses a plurality of fabric switches and a plurality of link segments linking the plurality of fabric switches in communication, and where determining the fixed latency of a clock tree path comprises:

determining a latency for each of the plurality of link segments;

determining a switch forwarding latency from an upstream clock port to a downstream clock port within each of the plurality of fabric switches, wherein the clock tree path includes a first link segment coupled to the upstream clock port and a second link segment coupled to the downstream clock port; and aggregating the latencies for each of the plurality of link segments and the switch forwarding latencies.

6. The method of claim 1, wherein data is transferred across the plurality of fabric links using a stream of flow control units (flits), and wherein the master clock time data is contained within at least one flit that is forwarded along the clock tree paths from the master clock node to the plurality of slave nodes.

7. The method of claim 6, wherein the master clock time data is contained in first and second flits, the first flit comprising an upper bit portion of the master clock time data and the second flit containing a lower bit portion of the master clock time data.

8. The method of claim 7, wherein a portion of the upper bit portion of the master clock time data in the first flit and the lower bit portion of the master clock time data in the second flit are overlapping, further comprising comparing the master clock time data bits in overlapping portion to determine that the upper bit portion and lower bit portion of the master clock time data is consistent.

9. The method of claim 6, further comprising:
receiving a flit stream comprising a stream of flits at a receive port of an upstream clock port of a fabric switch, the receive port having an associated receive buffer;
detecting that a first plurality of flits in the flit stream contain data corresponding to fabric packets;
storing the first plurality of flits in a receive buffer for the receive port;
detecting that a flit in the flit stream corresponds to a Time control flit containing master clock time data;
extracting the master clock time data from the Time control flit;
forwarding the master clock time data from the receive port to a downstream clock port in the fabric switch along a bypass circuit path;
encapsulating the master clock time data in a new Time control flit generated at a transmit port of the downstream clock port; and
injecting the new Time control flit into a flit stream that is sent outbound onto a fabric link from the transmit port.

10. The method of claim 6, further comprising:
receiving a flit stream comprising a stream of flits at a receive port of an upstream clock port of a fabric switch, the receive port having an associated receive buffer;
detecting that a flit in the flit stream corresponds to a Time control flit containing master clock time data;
forwarding the Time control flit from the receive port to a downstream clock port in the fabric switch without buffering the Time control flit in the receive buffer associated with the receive port; and
injecting the Time control flit into a flit stream that is sent outbound onto a fabric link from a transmit port of the downstream clock port.

11. The method of claim 6, wherein, for each slave node, the at least one flit containing the master clock time data is forwarded along a clock tree path from the master clock node to the slave node in a manner that guarantees data integrity of the master clock time data forwarded to the slave node.

12. The method of claim 1, further comprising determining a clock rate mismatch between the master clock and a local clock on a slave node.

13. The method of claim 12, wherein determining the clock rate mismatch between the master clock and the local clock comprises:
receiving first master clock time data at the slave node;
storing a first master clock time sample corresponding to the first master clock time data at the slave node;
in conjunction with receiving the first master clock time data, storing a first sample of the local clock at the slave node;
receiving second master clock time data at the slave node;
storing the second master clock time data at the slave node;
in conjunction with receiving the second master clock time data, storing a second sample of the local clock at the slave node;
subtracting the first master clock time data from the second master clock time data to obtain a master clock time sample difference;
subtracting the first sample from the second sample of the local clock to obtain a time difference for the local clock time sample difference; and
subtracting the local clock time sample difference from the master clock time sample difference and dividing the result by the local clock time sample difference to obtain the clock rate mismatch.

14. The method of claim 1, further comprising:
replacing a master clock node with a new master clock node; and
forwarding master clock time data generated by a master clock operating on the new master clock node to each of the plurality of slave nodes via clock tree paths having fixed latencies;
for a given slave node, determining the fixed latency of the clock tree path from the new master clock node to the slave node; and
synchronizing a local clock for the slave node and the master clock at the new master clock node using the master clock time data received by the slave node and the fixed latency of the clock tree path from the master clock node to the slave node that is determined.

15. A fabric switch, comprising:
a plurality of ports, each including a receive port operatively coupled to a receive buffer and a transmit port operative coupled to a transmit buffer, at least one port comprising an upstream clock port and at least one port comprising a downstream clock port;
switching circuitry that, during operation, enables selectable connection between a receive buffer of a first port and a transmit buffer of a second port;
at least one bypass circuit path between a receive port of an upstream clock port and a transmit port of a downstream clock port that enables master clock time data received at the receive port of the upstream clock port to be forwarded to the transmit port of the downstream clock port in a manner that bypasses the receive buffer for the receive port, and the transmit buffer for the transmit port,
wherein the receive port of the upstream clock port is configured to extract master clock time data when it is received at the receive port.

16. The fabric switch of claim 15, wherein the at least one circuit path comprises at least one ring bus having a plurality of ring node stops including respective ring node stops operatively coupled to each of the at least one upstream clock port and each of the at least one downstream clock port.

17. The fabric switch of claim 16, wherein the fabric switch is configured to be implemented in a fabric that transfers data along fabric links in a stream of flow control units (flits) comprising flit streams, and the fabric switch is further configured to:
receive a flit stream at an upstream clock port;
detect a Time control flit in the flit stream;
extract master clock time data from the Time control flit;
forward the master clock time data along a first ring bus; and
at each of a multiple ring stop nodes on the first interconnect;

encapsulate a copy of the master clock time data in a new Time control flit; and inject the new Time control flit into a flit stream sent outbound onto a fabric link from the downstream clock port to which the ring stop node is coupled.

18. The fabric switch of claim 16, wherein the fabric switch is configured to be implemented in a fabric that transfers data along fabric links in a stream of flow control units (flits) comprising flit streams, and the fabric switch is further configured to:

receive a flit stream at an upstream clock port;
detect a Time control flit in the flit stream;
forward the Time control flit along a first ring bus; and
at each ring stop node on the first interconnect;
  inject a copy of the Time control flit into a flit stream sent outbound onto a fabric link from the downstream clock port to which the ring stop node is coupled.

19. The fabric switch of claim 15, wherein the at least one circuit path comprises first and second ring busses, each having a plurality of ring node stops including respective ring node stops operatively coupled to each of the at least one upstream clock port and each of the at least one downstream clock port, wherein data is forwarded along the first ring bus in a clockwise direction and data is forwarded along a second ring bus in a counter-clockwise direction.

20. The fabric switch of claim 15, wherein the fabric switch is configured to be implemented in a fabric that transfers data along fabric links in a stream of flow control units (flits) comprising flit streams, the fabric switch further comprising:

Time control flit extraction logic at each of the at least one upstream clock port, configured to extract Time control flits from a received flit stream comprising master clock time data and forward one of a) an extracted Time control flit or b) master time data contained in an extracted Time control flit along a bypass circuit path between the upstream clock port and at least one downstream clock port.

21. The fabric switch of claim 20, further comprising:
Time control flit injection logic at each of the at least one downstream clock ports, configured to at least one of, a) receive master time data forwarded from an upstream clock port along the bypass circuit path, generate a new Time control flit, and inject the new Time control flit into a flit stream sent outbound onto a fabric link from the downstream clock port; and b) receive a Time control flit forwarded from an upstream clock port along the bypass circuit path, and inject the Time control flit into a flit stream sent outbound onto a fabric link from the downstream clock port.

22. A system comprising:
a master clock node having a master clock and including a host fabric interface (HFI);
a plurality of slave nodes, each including a local clock and including an HFI;
a plurality of fabric switches, each including,
  a plurality of ports, each including a receive port operatively coupled to a receive buffer and a transmit port operative coupled to a transmit buffer, at least one port comprising an upstream clock port and at least one port comprising a downstream clock port;
  switching circuitry that, during operation, enables selectable connection between pairs of receive buffers and transmit buffers of different ports;
  at least one bypass circuit path between the at least one upstream clock port and the at least one downstream clock port; and
a plurality of fabric links interconnect ports on the plurality of fabric switches, the master clock node, and the plurality of slave nodes,
wherein during operation of the system the master clock node generates master clock time data that is forwarded to each of the slave nodes via a clock tree path having a fixed latency, wherein each clock tree path traverses the bypass circuit path for at least one fabric switch and a plurality of fabric links.

23. The system of claim 22, wherein each fabric switch is configured to forward master clock time data along the at least one bypass circuit path in a manner that bypasses the receive buffers, the transmit buffers, and the switching circuitry.

24. The system of claim 23, wherein the system performs operations to facilitate synchronization of the local clocks on the slave nodes with the master clock comprising:

forwarding master clock time data generated by the master clock to each of the plurality of slave nodes via a respective clock tree path having fixed latency;

for each slave node, determining the fixed latency of the clock tree path from the master clock node to the slave node; and synchronizing a local clock for the slave node and the master clock operating on the master clock node using the master clock time data received by the slave node and the fixed latency of the clock tree path from the master clock node to the slave node that is determined.

25. The system of claim 23, wherein the system is further configured to:

determine a clock rate mismatch of the local clock on each slave node relative to the master clock; and employ the clock rate mismatch determined for each local clock to maintain synchronization between the master clock and each local clock.

* * * * *